US010915180B2

United States Patent
Marggraff et al.

(10) Patent No.: US 10,915,180 B2
(45) Date of Patent: *Feb. 9, 2021

(54) SYSTEMS AND METHODS FOR MONITORING A USER'S EYE

(71) Applicant: Google LLC, Mountain View, CA (US)

(72) Inventors: Lewis James Marggraff, Lafayette, CA (US); Eliot Francis Drake, Reno, NV (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/028,505

(22) Filed: Jul. 6, 2018

(65) Prior Publication Data

US 2019/0179418 A1 Jun. 13, 2019
US 2020/0387226 A9 Dec. 10, 2020

Related U.S. Application Data

(63) Continuation of application No. 15/835,891, filed on Dec. 8, 2017, which is a continuation of application
(Continued)

(51) Int. Cl.
*G06F 1/16* (2006.01)
*G06F 3/0485* (2013.01)
(Continued)

(52) U.S. Cl.
CPC ............ *G06F 3/017* (2013.01); *G06F 1/1686* (2013.01); *G06F 1/1694* (2013.01); *G06F 3/013* (2013.01);
(Continued)

(58) Field of Classification Search
CPC ...... G06F 3/013; G06F 3/017; G06F 3/04842; G06F 3/1686; G06F 3/1694
See application file for complete search history.

(56) References Cited

U.S. PATENT DOCUMENTS

| 7,460,940 | B2 | 12/2008 | Larsson et al. | |
|---|---|---|---|---|
| 7,488,294 | B2 * | 2/2009 | Torch | A61B 3/112 600/558 |

(Continued)

FOREIGN PATENT DOCUMENTS

| JP | 2005252734 A | 9/2005 |
|---|---|---|
| JP | 2010-061285 A | 3/2010 |

OTHER PUBLICATIONS

Chinese Office Action dated Jul. 8, 2019 for corresponding Chinese Patent Application No. 201480075406.4, 7 pages.
(Continued)

*Primary Examiner* — Ricardo Osorio

(57) ABSTRACT

Systems are presented herein, which may be implemented in a wearable device. The system is designed to allow a user to edit media images captured with the wearable device. The system employs eye tracking data to control various editing functions, whether prior to the time of capture, during the time of capture, or after the time of capture. Also presented are methods for determining which sections or regions of media images may be of greater interest to a user or viewer. The method employs eye tracking data to assign saliency to captured media. In both the system and the method, eye tracking data may be combined with data from additional sensors in order to enhance operation.

20 Claims, 20 Drawing Sheets

Related U.S. Application Data

No. 14/588,371, filed on Dec. 31, 2014, now Pat. No. 9,870,060.

(60) Provisional application No. 62/074,920, filed on Nov. 4, 2014, provisional application No. 62/074,927, filed on Nov. 4, 2014, provisional application No. 61/991,435, filed on May 9, 2014, provisional application No. 61/922,724, filed on Dec. 31, 2013.

(51) Int. Cl.
*G06F 3/01* (2006.01)
*G06F 3/0484* (2013.01)
*G02B 27/01* (2006.01)

(52) U.S. Cl.
CPC ........ *G06F 3/0485* (2013.01); *G06F 3/04842* (2013.01); *G06F 3/04845* (2013.01); *G02B 27/0172* (2013.01); *G02B 2027/0178* (2013.01); *G06F 2203/04806* (2013.01)

(56) References Cited

U.S. PATENT DOCUMENTS

| | | | |
|---|---|---|---|
| RE41,376 E * | 6/2010 | Torch | A61B 3/0066 340/575 |
| 8,126,208 B2 | 2/2012 | Steinberg et al. | |
| 9,201,512 B1 * | 12/2015 | Raffle | G06F 3/033 |
| 9,213,403 B1 | 12/2015 | Raffle et al. | |
| 9,600,069 B2 * | 3/2017 | Publicover | G06F 3/013 |
| 9,690,099 B2 | 6/2017 | Bar-Zeev et al. | |
| 9,870,060 B2 * | 1/2018 | Marggraff | G06F 3/017 |
| 9,955,903 B2 * | 5/2018 | Kobetski | A61B 5/18 |
| 2001/0028309 A1 * | 10/2001 | Torch | A61B 3/0066 340/575 |
| 2004/0100567 A1 | 5/2004 | Miller et al. | |
| 2009/0027337 A1 | 1/2009 | Hildreth | |
| 2010/0039458 A1 * | 2/2010 | Nathan | G09G 3/3233 345/698 |
| 2011/0044512 A1 * | 2/2011 | Bambha | G06K 9/00221 382/118 |
| 2011/0161163 A1 | 6/2011 | Carlson et al. | |
| 2011/0170067 A1 | 7/2011 | Sato et al. | |
| 2012/0290401 A1 * | 11/2012 | Neven | A61B 3/113 705/14.68 |
| 2013/0021374 A1 | 1/2013 | Miao et al. | |
| 2013/0050258 A1 * | 2/2013 | Liu | G02B 27/017 345/633 |
| 2013/0083063 A1 * | 4/2013 | Geisner | G06F 3/011 345/633 |
| 2013/0088482 A1 * | 4/2013 | Nathan | G09G 3/3233 345/212 |
| 2013/0156265 A1 | 6/2013 | Hennessy | |
| 2013/0235074 A1 * | 9/2013 | Cherna | G06T 11/60 345/619 |
| 2013/0258089 A1 | 10/2013 | Lyons et al. | |
| 2013/0328925 A1 * | 12/2013 | Latta | G09G 3/003 345/633 |
| 2014/0003738 A1 * | 1/2014 | Williams | A61B 3/113 382/282 |
| 2014/0146156 A1 * | 5/2014 | Strombom | A61B 3/113 348/78 |
| 2014/0176591 A1 * | 6/2014 | Klein | G09G 3/003 345/589 |
| 2014/0328570 A1 | 11/2014 | Cheng et al. | |
| 2014/0347265 A1 | 11/2014 | Aimone et al. | |
| 2015/0049112 A1 * | 2/2015 | Liu | G06T 19/006 345/633 |
| 2015/0160839 A1 | 6/2015 | Krishnaswamy et al. | |
| 2015/0326570 A1 * | 11/2015 | Publicover | G06F 21/64 726/4 |
| 2017/0147880 A1 * | 5/2017 | Gomez | C23C 4/06 |

OTHER PUBLICATIONS

PCT Search Report and Written Opinion dated Mar. 27, 2015 for corresponding International Application No. PCT/US2014/073094, 18 pages.
Chinese Office Action dated Aug. 28, 2018 for corresponding CN Application No. 201480075406.4, 19 pages.
Japanese Office Action dated Sep. 5, 2018 for corresponding JP Application No. 2016-544612, 6 pages.
Non-Final Office Action dated Jul. 10, 2019 for U.S. Appl. No. 15/835,891, 15 pages.
European Examination Report dated Jun. 7, 2019 for EP Application No. 14876031.7, 6 pages.
Non-Final Office Action dated Jun. 1, 2020 for U.S. Appl. No. 15/835,891, 31 pages.
English Translation of Korean Office Action dated Feb. 19, 2020 for corresponding KR Application No. 10-2016-7020195, 13 pages.
European Examination Report dated Jan. 29, 2020 for corresponding EP Application No. 14 876 031.7, 4 pages.
Chinese Notice of Grant dated Feb. 2020 for corresponding CN Application No. 201480075406.4, 4 pages.
Notice of Allowance dated Aug. 15, 2020 for corresponding Korean Application No. 10-2016-7020195, 10 pages.

* cited by examiner

SYSTEMS AND METHODS FOR MONITORING A USER'S EYE

CROSS-REFERENCE TO RELATED APPLICATION

The present disclosure is a continuation to and claims priority to U.S. patent application Ser. No. 15/835,891, entitled "Systems and Methods for Gaze-Based Media Selection and Editing" and filed on Dec. 8, 2017, which is a continuation to U.S. patent application Ser. No. 14/588,371, entitled "Systems and Methods for Gaze-Based Media Selection and Editing" and filed on Dec. 31, 2014, the entirety of which is incorporated by reference herein.

This application also relates generally to exemplary wearable devices, components, processes, and other features that may be included in the systems and methods herein disclosed in Publications Nos. 2007/0273611, 2014/01847752014/0218281, and pending U.S. application Ser. No. 12/687,125, filed Jan. 13, 2010, the entire disclosures of which are expressly incorporated by reference herein.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but of reserves all rights to the copyright whatsoever. The following notice applies to the software, screenshots and data as described below and in the drawings hereto and All Rights Reserved.

TECHNICAL FIELD

The present invention relates generally to apparatus, systems, and methods for monitoring a human eye, e.g., for monitoring fatigue, purposeful communication, and/or controlling devices based upon movement or an eye, eyelid, and/or other components of the eye or eyes of a person. Further the present invention relates more specifically to systems and methods that allow a user to edit media images captured with the wearable device. The system employs an eye tracking subsystem that projects a reference frame onto the eye and associates the projected reference frame with a second reference frame of a display for capturing eye tracking data of at least one eye of a user to control various editing functions, whether prior to the time of capture, during the time of capture, or after the time of capture.

BACKGROUND

As portable electronic devices have proliferated and become increasingly powerful and capable, the features for which they are commonly used have shifted. As pocket-sized devices have transitioned from being purely communication devices, to becoming content-consumption devices, to becoming content-creation devices, users have also transitioned towards becoming prodigious content-creators. It is estimated that ten percent of all photographs ever captured were taken in 2012. Similar creation rates apply to video footage. The advent of head-mounted video capture devices such as the Go-Pro camera and Google Glass is accelerating video captured in the general field of view of users. Unfortunately, this glut of image capture has not raised the quality of the created content. Particularly with video footage, the time required to inspect, process, edit, and/or export clips of interest is proportional to the amount of footage recorded. Thus, if the amount of captured footage increases, the amount of time required to extract worthwhile content increases in a roughly linear fashion.

For all disclosures and claims within the present application, a "media image" is defined as at least one of a video image and a still image.

With any type of media images, a typical goal for a content creator is to produce desirable content for a specific audience. The definition of "desirable" may change based on the audience. With specific regard to video images, one method or set of criteria for selecting and editing video images may be appropriate for one audience, but not to another. Furthermore, images that are captured close in time to other images may be desirable for different reasons. These various incarnations of desirability and relevancy may be referred to simply as "saliency."

A media image may be considered salient for any number of reasons: it may contain a notable event, it may include a particular friend or relative, it may contain an occurrence that others consider interesting in social media outlets, it may have been captured at a particular location, and/or it may contain emotions that a user wishes to capture. It is assumed that the addition of eye tracking to other sensors allows a user a level of analysis and control during this process that would not be available without the advent of eye tracking.

Careful consideration is required when discussing the scope intended by the word "editing." In typical photo and video applications, editing typically connotes manipulation of images, or, in the case of video, also includes the process of rearranging trimmed images into a more desirable order. "Editing" many times excludes the steps of selecting or tagging images on which further steps will be performed, even though those steps should formally be considered part of the editing process. However, for purposes of the disclosure and claims within the present application, "editing" shall include the selecting and tagging steps. Furthermore, in the era before digital media creation, all editing (including selecting and tagging) necessarily occurred considerably after the time of capture. However, features are now included in video and still cameras that allow for the editing process to occur immediately after the time of capture, or "in-camera." The disclosure herein describes how the process of editing may shift to include times during or even before capture. However, it has not been practically feasible to do so until the systems and methods described herein are implemented.

Unfortunately, for many users, the time commitment required to convert as-captured video images into consumable finished video is a terminal impediment to the process. There are two common outcomes after encountering this impediment. The first is that the entire process is abandoned, and no video images are ever shared with the audience. The second common outcome is that all editing is eschewed and images of extremely low quality and relevance are shared with the audience. Neither of these outcomes is desirable, both for the creator and for the audience. For the creator, this may reduce his or her willingness to record video, knowing that it is too difficult to edit it to a presentable form. For the consumer, watching bad video images provides them with negative reinforcement and may prevent them from wanting to watch video images in the future.

As technology advances, the form factor of the devices a user may carry to create content has shifted, as well. Content-creation devices used to be devoid of other technology. Then smartphones and tablets became capable of capturing video, ushering in an era of miniaturization that was previously unimaginable. Now, head-mounted displays are starting to become feasible as consumer devices, marking a shift in wearable technology that allows it to create content instead of merely logging data from sensors or otherwise. Further, contact lenses and artificial retina are viable enhancements to the human visual system. The systems and methods herein are applicable to these modes capturing video, tracking eye direction, and editing salient video as well, and are considered part of the present invention. As the requisite technology for determining a user's gaze through eye tracking can now be incorporated into wearable and implanted devices, the eyes become a feasible tool for device input and editing.

Applicant(s) believe(s) that the material incorporated above is "non-essential" in accordance with 37 CFR 1.57, because it is referred to for purposes of indicating the background of the invention or illustrating the state of the art. However, if the Examiner believes that any of the above-incorporated material constitutes "essential material" within the meaning of 37 CFR 1.57(c)(1)-(3), applicant(s) will amend the specification to expressly recite the essential material that is incorporated by reference as allowed by the applicable rules.

SUMMARY

Although the best understanding of the present invention will be had from a thorough reading of the specification and claims presented below, this summary is provided in order to acquaint the reader with some of the new and useful features of the systems and methods described in the present application. Of course, this summary is not intended to be a complete litany of all of the features of the systems and methods herein, nor is it intended in any way to limit the breadth of the claims, which are presented at the end of the detailed description of this application.

The present invention provides systems and methods which may be implemented in a wearable device. The system is designed to allow a user to edit media images captured with the wearable device. The systems may employ eye tracking data to control various editing functions, whether prior to the time of capture, during the time of capture, or after the time of capture. Also presented are methods for determined which sections or of media images may be of greater interest to a user or viewer. The methods may employ eye tracking data to assign saliency to captured media. In both the systems and methods, eye tracking data may be combined with data from additional sensors in order to enhance operation.

In view of the foregoing, the present application describes apparatus, systems, and methods for editing media images comprising a wearable device, a scene camera mounted on the device such that the scene camera captures media images of a user's surroundings, an eye tracking subsystem that projects a reference frame unto the eye and associates the projected reference frame with a second reference frame of a display fin capturing eye tracking data of at least one eye of a user, and one or more processors communicating with the scene camera and eye tracking subsystem for tagging media images captured by the scene camera based at least in part on the eye tracking data.

In another embodiment, the apparatus, systems, and methods may quantitatively assess comparative saliency in video images as determined by proximally-located wearable devices with the purpose of recording relevant events from different viewpoints, including a plurality of wearable devices configured to be worn by individual users, each wearable device including a scene camera mounted thereon such that the scene camera captures media images of the individual user's surroundings, one or more sensors, and a communication interface; a server for communicating with the wearable devices via each wearable device's communication interface.

In still another embodiment, a method is provided for selecting or editing media images from a wearable device worn by a user that includes capturing media images, using a scene camera on the wearable device, of the user's surroundings; capturing eye tracking data, using an eye tracking subsystem on the wearable device, of at least one eye of the user; and at least one of selecting and editing the media images based at least in part on actions of the at least one eye events identified from the eye tracking data.

Aspects and applications of the invention presented here are described below in the drawings and detailed description of the invention. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the features of the systems and methods herein. To the contrary, if the provisions of 35 U.S.C. § 112, ¶6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ", if the claims also recite any structure, material or acts in support of that means or step, or that perform the recited function, then it is the clear intention of the inventors not to invoke the provisions of 35 U.S.C. § 112, ¶6. Moreover, even if the provisions of 35 U.S.C. § 112, ¶6 are invoked to define the claimed inventions, it is intended that the related features not be limited only to the specific structure, material or acts that are described in the exemplary embodiments, but in addition, include any and all structures, materials or acts that perform the claimed function as described in alternative embodiments or forms of the features, or that are well known present or later-developed, equivalent structures, material or acts for performing the claimed function.

BRIEF DESCRIPTION OF THE DRAWINGS

A more complete understanding of the present invention may be derived by referring to the detailed description when considered in connection with the following illustrative figures. In the figures, like-reference numbers refer to like-elements or acts throughout the figures. The presently exemplary embodiments of the invention are illustrated in the accompanying drawings, in which.

DETAILED DESCRIPTION

Figure 1:
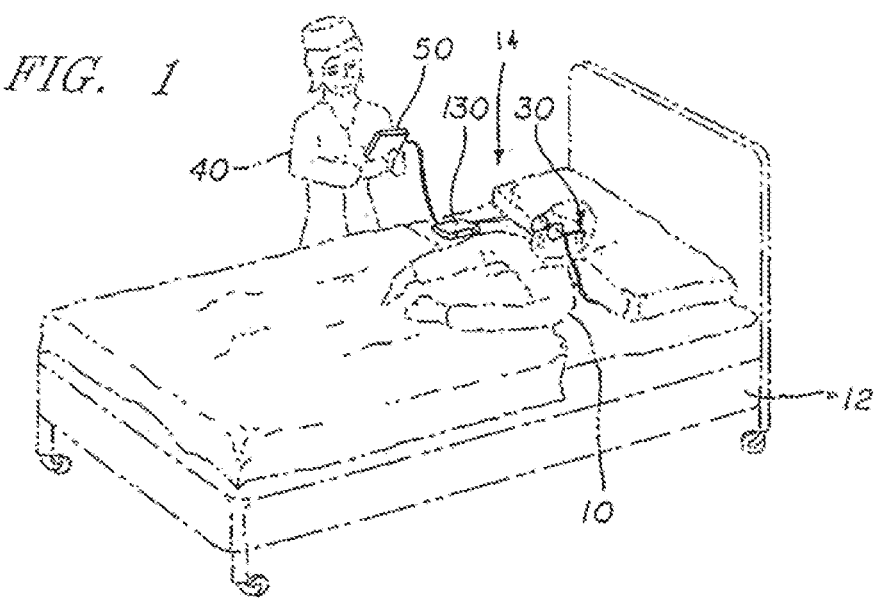
FIG. 1 is a perspective view of a patient in a hospital wearing an embodiment of an apparatus for monitoring the patent based upon movement of the patient's eye and/or eyelid.

Turning to the drawings, FIG. 1 shows a patient 10 in a bed 12 wearing a detection device 30 for detecting eye and/or eyelid movement of the patient 10. The detection device 30 may include any of the biosensor devices described herein, which may be used for monitoring voluntary movement of the eye, e.g., for purposeful communication, for monitoring involuntary eye movement, e.g., drowsiness or other conditions, and/or for controlling of one or more electronic devices (not shown). The detection device 30 may be coupled to a processing box 130 that converts the detected eye and/or eyelid movement into a stream of data, an understandable message, and/or into other information, may be communicated, for example, using a video display 50, to a medical care provider 40.

Figure 2:
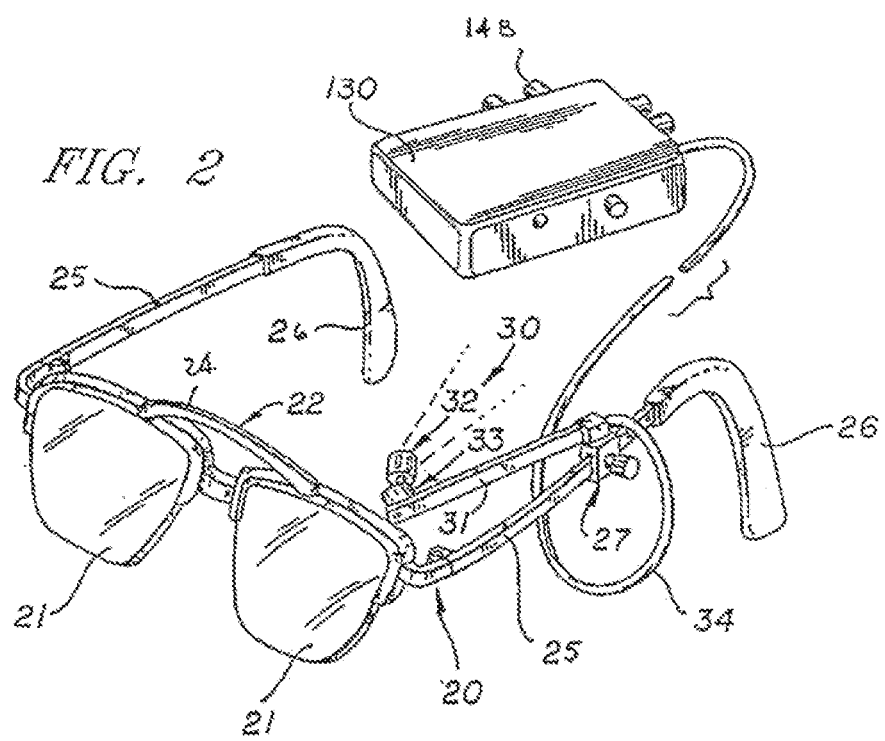
FIG. 2 is an enlarged perspective view of the embodiment of FIG. 1, including a detection device and a processing box.

Turning to FIG. 2, an exemplary embodiment of an apparatus or system 14 is shown that includes an aim-able and focusable detection device 30 that is attachable to a conventional pair of eyeglasses 20. The eyeglasses 20 include a pair of lenses 21 attached to a frame 22, which includes bridgework 24 extending between the lenses 21, and side members or temple pieces 25 carrying ear pieces 26, all of which are conventional. Alternatively, because the lenses 21 may not be necessary, the frame 22 may also be provided without the lenses 21.

The detection device 30 includes a clamp or other mechanism 27 for attaching to one of the side members 25 and an adjustable arm 31 onto which is mounted one or more emitters 32 and sensors 33 (one shown). The emitter 32 and sensor 33 are mounted in a predetermined relationship such that the emitter 32 may emit a signal towards an eye 300 of a person wearing the eyeglasses 20 and the sensor 33 may detect the signal reflected from the surface of the eye 300 and eyelid 302. Alternatively, the emitter 32 and sensor 33 may be mounted adjacent one another.

In one embodiment, the emitter 32 and sensor 33 produce and detect continuous or pulsed light, respectively, e.g., within the infrared range to minimize distraction or interference with the wearer's normal vision. The emitter 32 may emit light in pulses at a predetermined frequency and the sensor 33 is configured to detect light pulses at the predetermined frequency. This pulsed operation may reduce energy consumption by the emitter 32 and/or may minimize interference with other light sources.

Alternatively, other predetermined frequency ranges of light beyond or within the visible spectrum, such as ultraviolet light, or other forms of energy, such as radio waves, sonic waves, and the like, may be used.

The processing box 130 is coupled to the detection device 30 by a cable 34 including one or more wires therein (not shown). The processing box 130 may include a central processing unit (CPU) and/or other circuitry, such as the exemplary circuitry shown in the applications incorporated by reference elsewhere herein. The processing box 130 may also include control circuitry for controlling the emitter 32 and/or the sensor 33, or the CPU may include internal control circuitry.

For example, in one embodiment, the control circuitry may control the emitter 32 to produce a flickering infrared signal pulsed at a predetermined frequency, as high as thousands of pulses per second to as little as about 4-5 pulses per second, e.g., at least about 5-20 pulses per second, thereby facilitating detection of non-purposeful or purposeful eye blinks as short as about 200 milliseconds per blink. The sensor 33 may be controlled to detect light pulses only at the predetermined frequency specific to the flicker frequency of the emitter 32. Thus, by synchronizing the emitter 32 and the sensor 33 to the predetermined frequency, the system 10 may be used under a variety of ambient conditions without the output signal being substantially affected by, for example, bright sun light, total darkness, ambient infrared light backgrounds, or other emitters operating at different flicker frequencies. The flicker frequency may be adjusted to maximize the efficient measurement of the number of eye blinks per unit time (e.g. about ten to about twenty eye blinks per minute), the duration of each eye blink (e.g. about 200 milliseconds to about 300 milliseconds), and/or PERCLOS (i.e., the percentage of time that the eyelid is completely or partially closed), or to maximize efficiency of the system, while keeping power consumption to a minimum.

The control circuitry and/or processing box 130 may include manual and/or software controls (not shown) for adjusting the frequency, focus, or intensity of the light emitted by the emitter 32, to turn the emitter 32 off and on, to adjust the threshold sensitivity of the sensor 33, and/or to allow for self-focusing with maximal infrared reflection off of a closed eyelid, as will be appreciated by those skilled in the art.

In addition, the processing box 130 also may include a power source tor providing power to the emitter 32, the sensor 33, the CPU, and/or other components in the processing box 130. The processor box 130 may be powered by a conventional DC battery, e.g., a nine volt battery or rechargeable lithium, cadmium, or hydrogen-generated battery, and/or by solar cells attached to or built within the system 14. Alternatively, an adapter (not shown) may be connected to the processor box 130, such as a conventional AC adapter or a twelve volt automobile lighter adapter.

Alternatively, the receiver 156 may be coupled directly to a variety of devices (not shown), such as radio or television controls, lamps, fans, heaters, motors, vibro-tactile seats, remote control vehicles, vehicle monitoring or controlling devices, computers, printers, telephones, lifeline units, electronic toys, or augmentative communication systems, to provide a direct interface between the person and the devices.

In additional alternatives, one or more lenses or filters may be provided for controlling the light emitted and/or detected by the biosensor device, an individual emitter, and or detector. For example, the angle of the tight emitted may be changed with a prism or other lens, or the light may be columnated or focused through a slit to create a predetermined shaped beam of light directed at the eye or to receive the reflected light by the sensor. An array of lenses may be provided that are adjustable to control the shape, e.g. the width, etc., of the beam of light emitted or to adjust the sensitivity of the sensor. The lenses may be encased along with the emitter in plastic and the like, or provided as a separate attachment, as will be appreciated by those skilled in the art.

Figure 3:
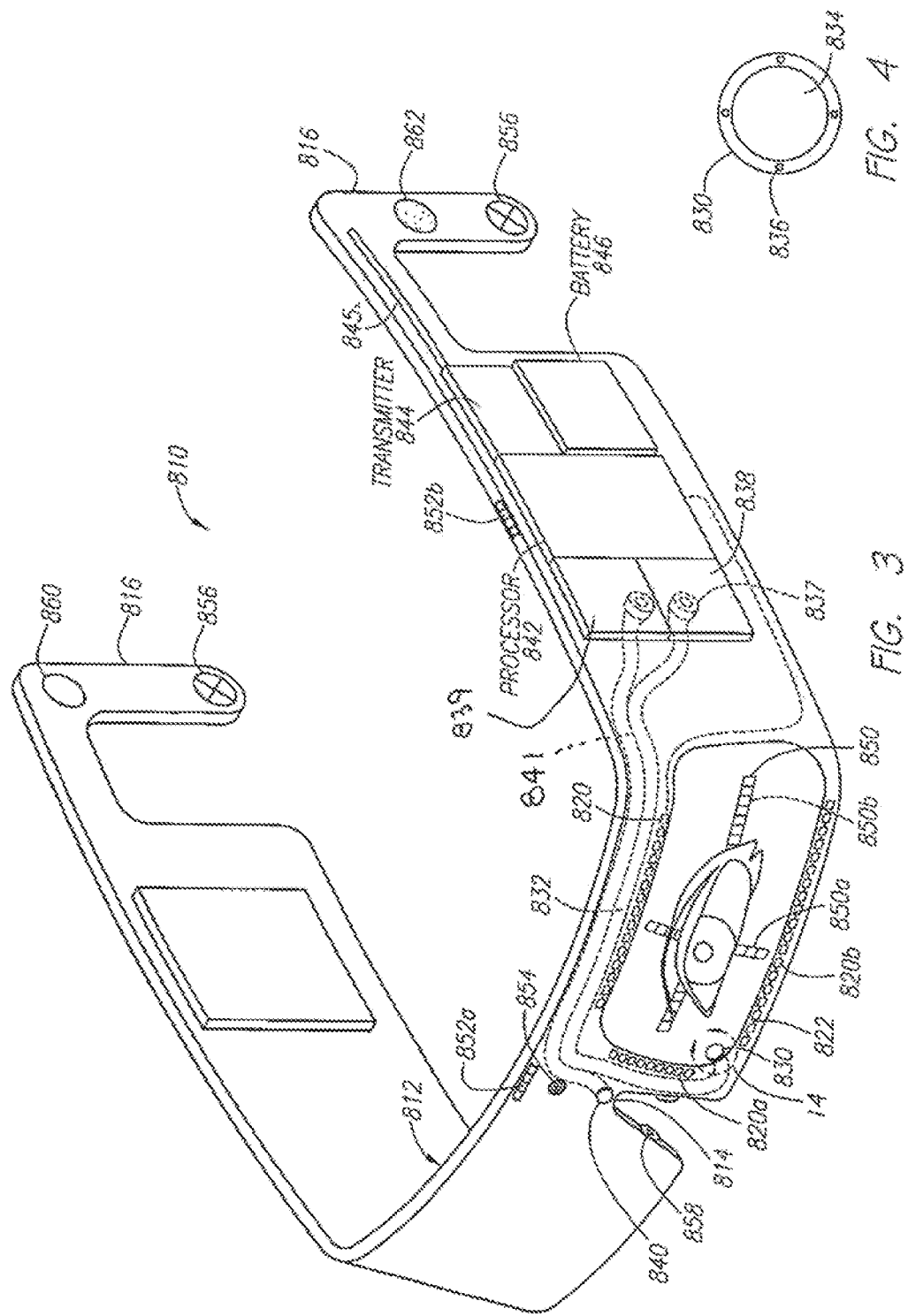
FIG. 3 is a perspective view of another system for monitoring a person based upon movement of the person's eye and/or eyelid.

Turning to FIG. 3, yet another embodiment of a system 810 for monitoring eye movement is shown. Generally, the system 810 includes a frame 812 that may include a bridge piece 814 and a pair of ear supports 816, one or more emitters 820, one or more sensors 822, and/or one or more cameras 830, 840. The frame 812 may include a pair of lenses (not shown), such as prescription, shaded, or protective lenses, although they may be omitted. Alternatively, the system may be provided on other devices that may be worn on a user's head, such as a pilot's oxygen mask, protective eye gear, a patient's ventilator, a scuba or swimming mask, a helmet, a hat, a head band, a head visor, protective head gear, or within enclosed suits protecting the head and/or face, and the like (not shown). The components of the system may be provided at a variety of locations on the device that generally minimize interference with the user's vision and/or normal use of the device.

As shown, an array of emitters 820 are provided on the frame 812, e.g., in a vertical array 820a and a horizontal array 820b. In addition or alternatively, the emitters 820 may be provided in other configurations, such as a circular array (not shown), and may or may not include light filters and/or diffusers (also not shown). In an exemplary embodiment, the emitters 820 are infrared emitters configured to emit pulses at a predetermined frequency, similar to other embodiments described elsewhere herein. The emitters 820 may be arranged on the frame such that they project a reference frame 850 onto a region of the user's face including one of the user's eyes. As shown, the reference frame includes a pair of crossed bands 850a, 850b dividing the region into four quadrants. In an exemplary embodiment, the intersection of the crossed bands may be disposed at a location corresponding substantially to the eye's pupil during primary gaze, i.e., when the user is looking generally straight forward. Alternatively, other reference frames may be provided, e.g., including vertical and horizontal components, angular and radial components, or other orthogonal components. Optionally, even one or two reference points that remain substantially stationary may provide sufficient reference frame for determining relative movement of the eye, as explained further below.

An array of sensors 822 may also be provided on the frame 812 for detecting light from the emitters 820 that is reflected off of the user's eyelid. The sensors 822 may generate output signals having an intensity identifying whether the eyelid is closed or open, similar to other embodiments described elsewhere herein. The sensors 822 may be disposed adjacent to respective emitters 820 for detecting light reflected off of respective portions of the eyelid. Alternatively, sensors 822 may only be provided in a vertical array, e.g., along the bridge piece 814, for monitoring the amount of eyelid closure, similar to embodiments described elsewhere herein. In a further alternative, the emitters 820 and sensors 822 may be solid state biosensors (not shown) that provide both the emitting and sensing functions in a single device. Optionally, the emitters 820 and/or sensors 822 may be eliminated, e.g., if the cameras 830, 840 provide sufficient information, as explained further below.

Figure 7:
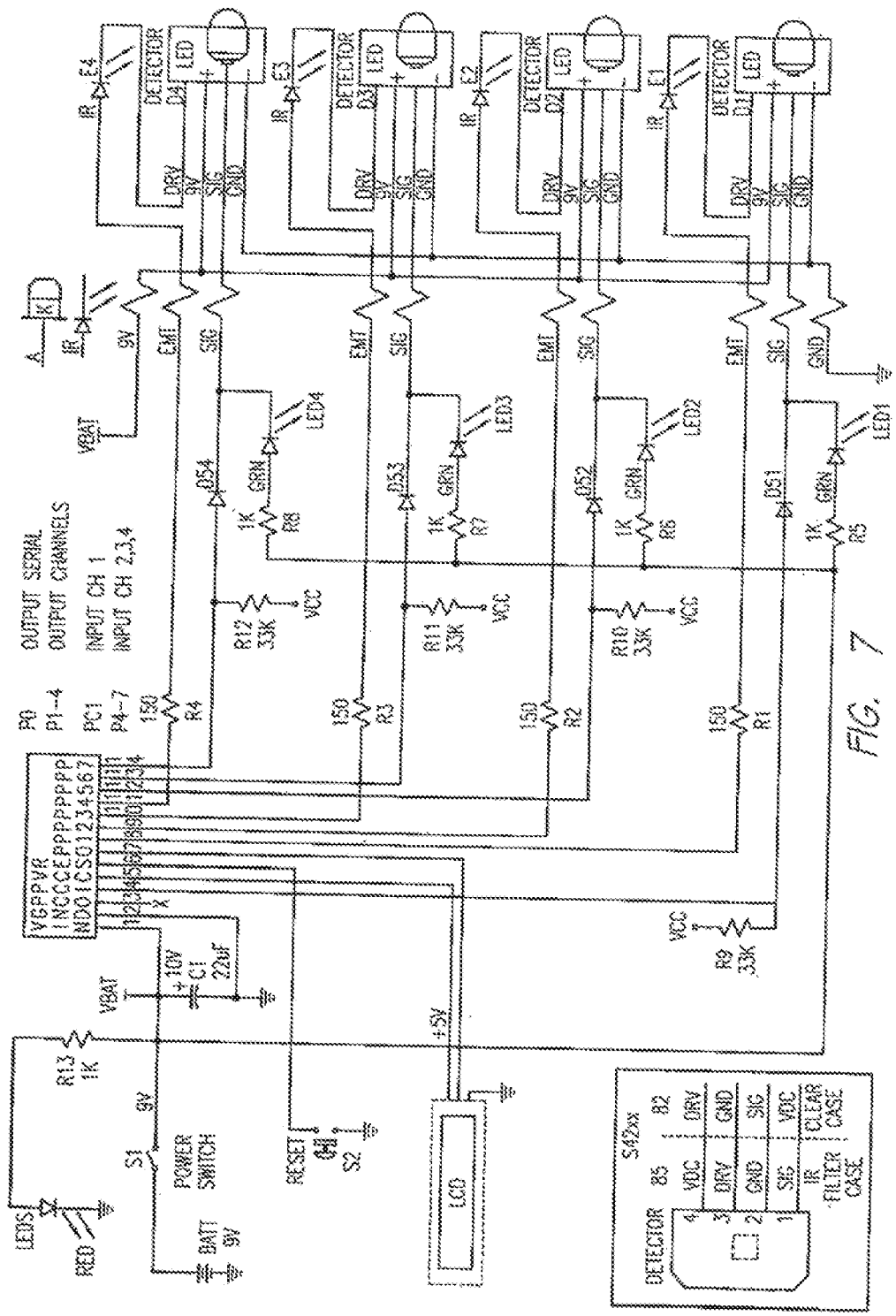
FIG. 7 is a schematic showing an exemplary embodiment of circuitry for processing signals from a five-element sensor array.

Circuitry and/or software may be provided for measuring PERCLOS or other parameters using the sign s generated by the array of sensors. For example, FIG. 7 shows an exemplary schematic that may be used for processing signals from a five element array, e.g., to obtain PERCLOS measurements or other alertness parameters.

Figure 4:
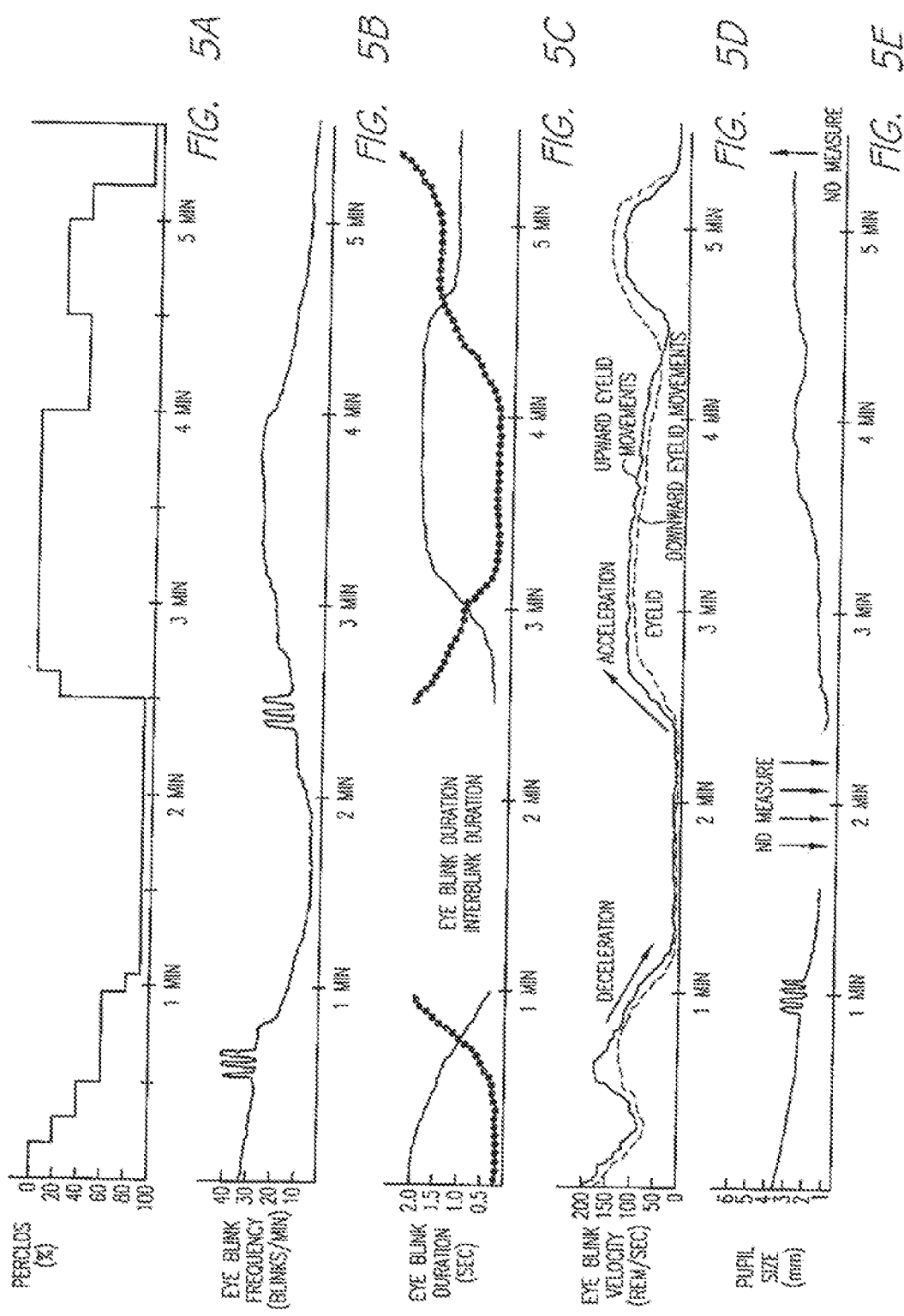
FIG. 4 is a detail of a camera on the frame of FIG. 3.
Figure 5:
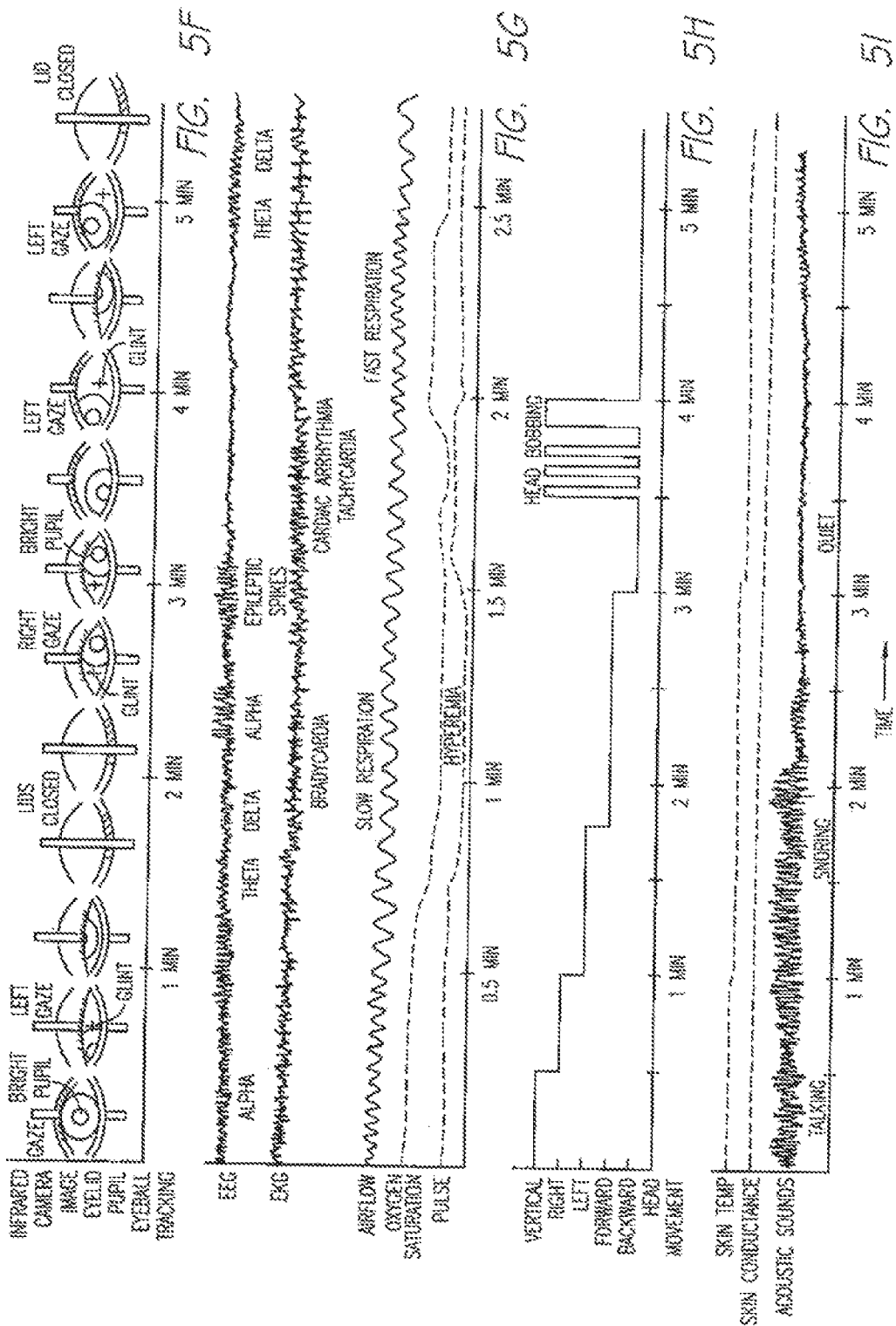
FIGS. 5A-5I are graphical displays of several parameters that may be monitored with the system of FIG. 3.

Returning to FIG. 3, the system 810 also includes one or more cameras 830 oriented generally towards one or both of the user's eyes. Each camera 830 may include a fiber optic bundle 832 including a first end mounted to or adjacent the bridge piece 814 (or elsewhere on the frame 812, e.g., at a location that minimizes interferences with the user's vision), and a second end 837 that is coupled to a detector 838, e.g., a CCD or CMOS sensor, which may convert images into digital video signals. An objective lens 834 may be provided on the first end of the fiber optic bundle 832, as shown in FIG. 4, e.g., to focus images onto the fiber optic bundle 832. Optionally, the fiber optic bundle 832 may include one or more illumination fibers that may terminate adjacent the lens 834 to provide emitters 836, also as shown in FIG. 4. The illumination fiber(s) may be coupled to a light source (not shown), e.g., similar to the embodiment shown in FIG. 9 and described further below. Although only one camera 830 is shown in FIG. 3 (e.g., for monitoring the user's left eye), it will be appreciated that another camera (not shown) may be provided in a symmetrical configuration for monitoring the other of the user's eyes (e.g., the right eye), including similar components, e.g., a fiber optic bundle, lens, emitter(s) and/or detector (although, optionally, the cameras may share a common detector, as explained further below).

Optionally, it may be desirable to have multiple cameras (not shown) directed towards each eye, e.g., from different angles facing the eye(s). Optionally, these camera(s) may include fiber optic extensions, prismatic lenses, and/or reflecting minors (e.g., reflecting infrared light), impenetrable or blocking mirrored surfaces on the side of the lenses facing the eyes, and the like. Such accessories may be provided for bending, turning, reflecting, or inverting the images of the eyes transmitted to the camera(s) in a desired manner.

The camera(s) 830 may be configured for detecting the frequency of light emitted by the emitters 820 and/or 836, e.g., infrared not or other light beyond the visible range. Optionally, if the fiber optic bundle(s) 832 include one or more illumination fibers for emitters 836, the emitters 820 on the frame 812 may be eliminated. In this embodiment, it may also be possible to eliminate the sensors 822, and use the camera(s) 830 to monitor movement of the user's eye(s), e.g., as explained further below. Optionally, the system 810 may include a second camera 840 oriented away from the user's head, e.g., to monitor the user's surroundings, such an area directly in front of the user's face. The camera 840 may include similar components to the camera 830, e.g., a fiber optic bundle 841, lens (not shown), and/or emitter(s) (also not shown). Optionally, the camera 830 may be sufficiently sensitive to generate images under ambient lighting conditions, and the emitters may be omitted. The camera 840 may be coupled to a separate detector 839, as shown in FIG. 3, or may share the detector 838 with the camera(s) 830, as explained further below.

One or both of the ear supports 816 may include a panel 818 for mounting one or more components, e.g., a controller or processor, such a exemplary processor 842, a transmitter 844, an antenna 845, detector(s) 838, 839, and/or a battery 846. The processor 840 may be coupled to the emitters 820, the sensors 822, and/or the cameras 830, 840 (e.g., to the detector(s) 838, 839) liar controlling their operation. The transmitter 844 may be coupled to the processor 842 and/or detector(s) 838, 839 for receiving the output signals from the sensors 822 and/or cameras 830, 840, e.g., to transmit the signals to a remote location, as described below. Alternatively, the transmitter 844 may be coupled directly to output leads from the sensors 822 and/or the cameras 835, 840. The frame 812 may also include manual controls (not shown), e.g., on the ear support 816, for example, to turn the power off and on, or to adjust the intensity and/or threshold of the emitters 820, the sensors 822, and/or the cameras 830, 840.

If desired, the system 810 may also include one or more additional sensors on the frame 812, e.g., physiological sensors, for example, for the purposes of integration and cross-correlation of additional bio- or neuro-physiological data relating to the cognitive, emotional, and/or behavioral state of the user. The sensors may be coupled to the processor 842 and/or to the transmitter 844 so that the signals from the sensors may be monitored, recorded, and/or transmitted to a remote location. For example, one or more position sensors 852a, 852b may be provided, e.g., for determining the spatial orientation of the frame 812, and consequently the user's head. For example, actigraphic sensors may be provided to measure tilt or movement of the head, e.g., to monitor whether the user's head is drooping forward or tilting to the side. Acoustic sensors, e.g., a microphone 854 may be provided for detecting environmental noise or sounds produced by the user.

In addition, the system 810 may include one or more feedback devices on the frame 812. These devices may provide feedback to the user, e.g., to alert and/or wake the user, when a predetermined condition is detected, e.g., a state of drowsiness or lack of consciousness. The feedback devices may be coupled to the processor 842, which may control their activation. For example, a mechanical vibrator device 860 may be provided at a location that may contact the user, e.g., on the ear support 816, that may provide tactile vibrating stimuli through skin contact. An electrode (not shown) may be provided that may produce relatively low power electrical stimuli. A visible white or colored light emitter, such as one or more LED's may be provided at desired locations, e.g., above the bridge piece 814. Alternatively, audio devices 862, such as a buzzer or other alarm, may be provided, similar to other embodiments described elsewhere herein. In a further alternative, aroma-emitters may be provided on the frame 810, e.g., on or adjacent to the bridge piece 814.

In addition or alternatively, one or more feedback devices may be provided separate from the frame 812, but located in a manner capable of providing a feedback response to the user. For example, audio, visual, tactile (e.g., vibrating seat), or olfactory emitters may be provided in the proximity of the user, such as any of the devices described elsewhere herein. In a further alternative, heat- or cold-generating devices may be provided that are capable of producing thermal stimuli to the user, e.g., a remotely controlled fan or air conditioning unit.

The system 810 may also include components that are remote horn the frame 812, similar to other embodiments described elsewhere herein. For example, the system 810 may include a receiver, a processor, and/or a display (not shown) at a remote location from the frame 812, e.g., in the same room, at a nearby monitoring station, or at a more distant location. The receiver may receive signals transmitted by the transmitter 842, including output signals from the sensors 822, cameras 830, 840, or any of the other sensors provided on the frame 812.

A processor may be coupled to the receiver for analyzing signals from the components on the frame 812, e.g., to prepare the signals for graphical display. For example, the processor may prepare the signals from the sensors 822 and/or cameras 830, 840 for display on a monitor, thereby allowing the user to be monitored by others. Simultaneously, other parameters may be displayed, either on a single or separate display(s). For example, FIGS. 5A-5I show signals indicating the output of various sensors that may be on the frame 812, which may be displayed along a common time axis or otherwise correlated to movement of the user's eye and/or level of drowsiness. The processor may superimpose or otherwise simultaneously display the video signals in conjunction with the other sensed parameters to allow a physician or other individual to monitor and personally correlate these parameters to the user's behavior.

Figure 6:
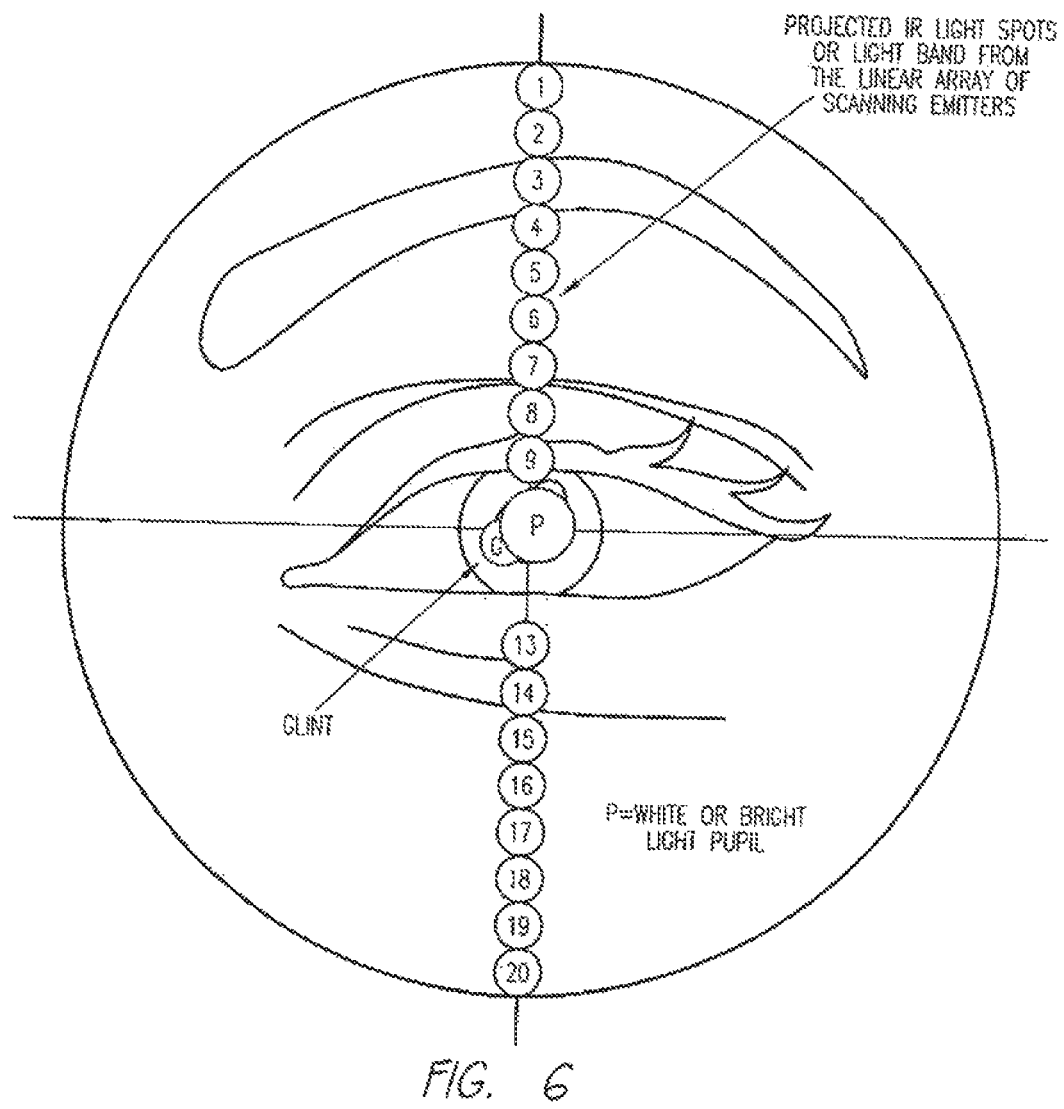
FIG. 6 is a detail of video output from a camera on the frame of FIG. 3.

The video signals from the camera 830 may be processed to monitor various eye parameters, such as pupillary size, location, e.g., within the four quadrant defined by the crossed bands 850, eye tracking movement, eye gaze distance, and the like. For example, because the camera(s) 830 may be capable of detecting the light emitted by the emitters 822, the camera(s) 830 may detect a reference frame projected onto the region of the user's eye by the emitters. FIG. 6 shows an exemplary video output from a camera included in a system having twenty emitters disposed in a vertical arrangement.

The camera may detect twenty discrete regions of light arranged as a vertical band. The camera may also detect a "glint" point, G, and or a moving bright pupil, P. Thus, the movement of the pupil may be monitored in relation to the glint point, G, and/or in relation to the vertical band 1-20.

Because the emitters 822 are fixed to the frame 812, the reference frame 850 may remain substantially stationary relative to the user. Thus, the processor may determine the location of the pupil in terms of orthogonal coordinates (e.g., x-y angle-radius) relative to the reference frame 850. Alternatively, if the reference frame is eliminated, the location of the pupil may be determined relative to any stationary "glint" point on the user's eye or other predetermined reference point. For example, the camera 830 itself may project a point of light onto the eye that may be reflected and detected by the camera. This "glint" point may remain substantially stationary since the camera 830 is fixed to the frame 812, thereby providing the desired reference point from which subsequent relative movement of the eye may be determined.

Figure 9:
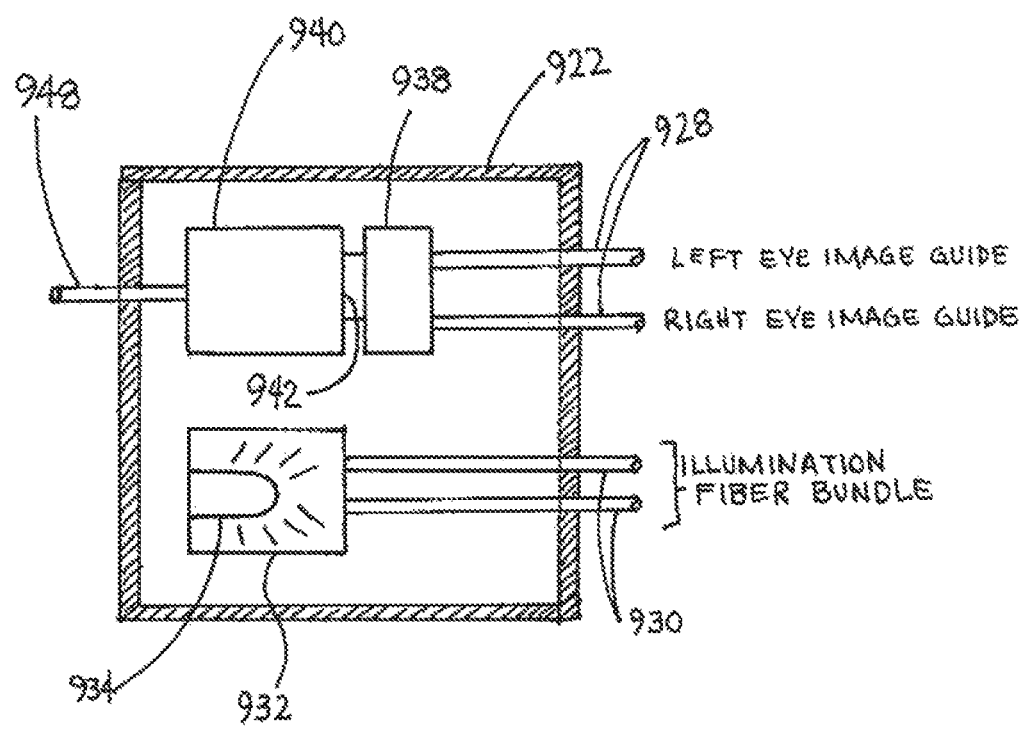
FIG. 9 is a schematic of a camera that may be included in the apparatus of FIGS. 8A and 8B.
Figure 10A:
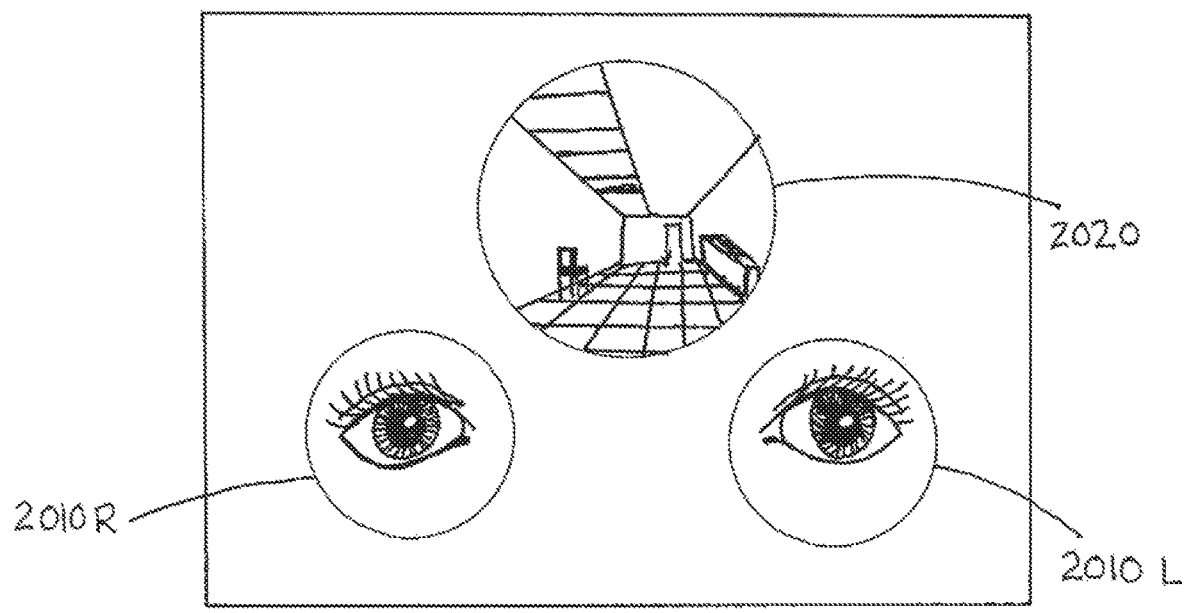
FIGS. 10A and 10B are graphical images, showing simultaneous outputs from multiple cameras, showing the person's eyes open and closing, respectively.
Figure 10B:
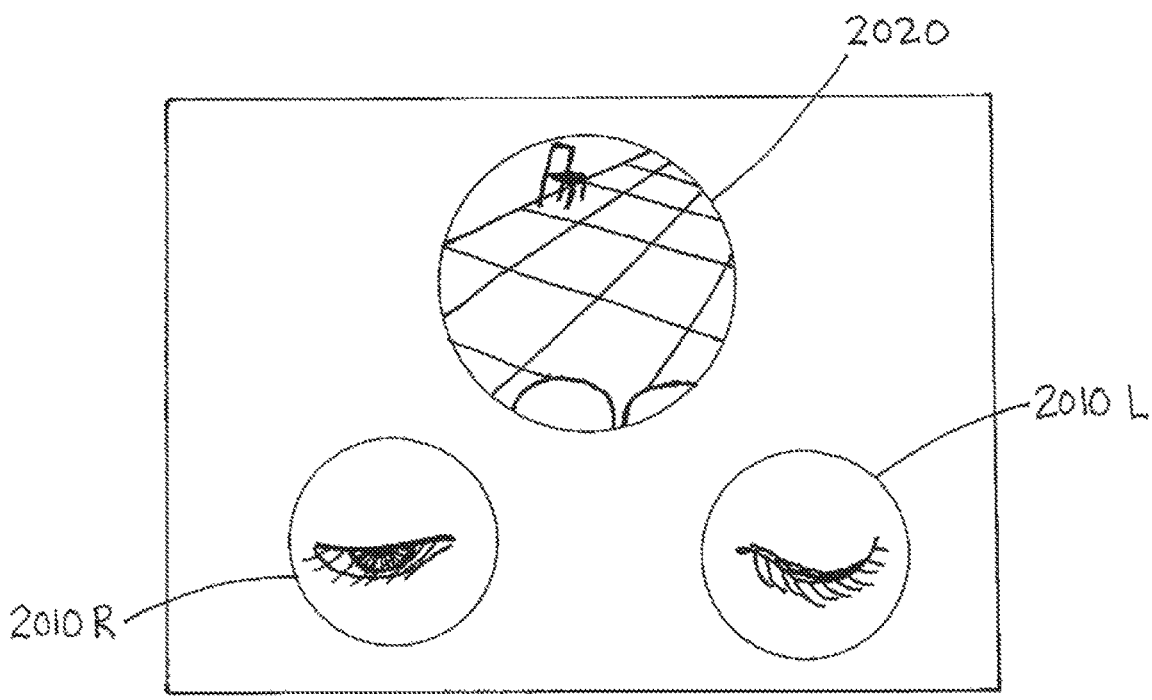

Returning to FIG. 3, in an alternative embodiment, the cameras 832, 840 may be coupled to a single detector (not shown), similar to the configuration shown in FIG. 9. The fiber optic bundles 832, 841 may be coupled to one or more lenses for delivering and/or focusing images from the cameras 830, 840 onto respective regions of the detector. The defector may be a CCD or CMOS chip having an active imaging area, e.g., between about five and ten millimeters (5-10 mm) in cross-section. In exemplary embodiments, the active imaging area of the detector may be square, rectangular, round, or elliptical, as long as there is sufficient area for receiving simultaneous images from both cameras 830 and camera 840. Exemplary outputs displaying simultaneous video images from the cameras 830, 840 is shown in FIGS. 10A and 10B, and described further below. In this alternative, with sufficient resolution and processing, it may be possible to eliminate the emitters 820 and/or sensors 822 from the system 810.

Figure 8A:
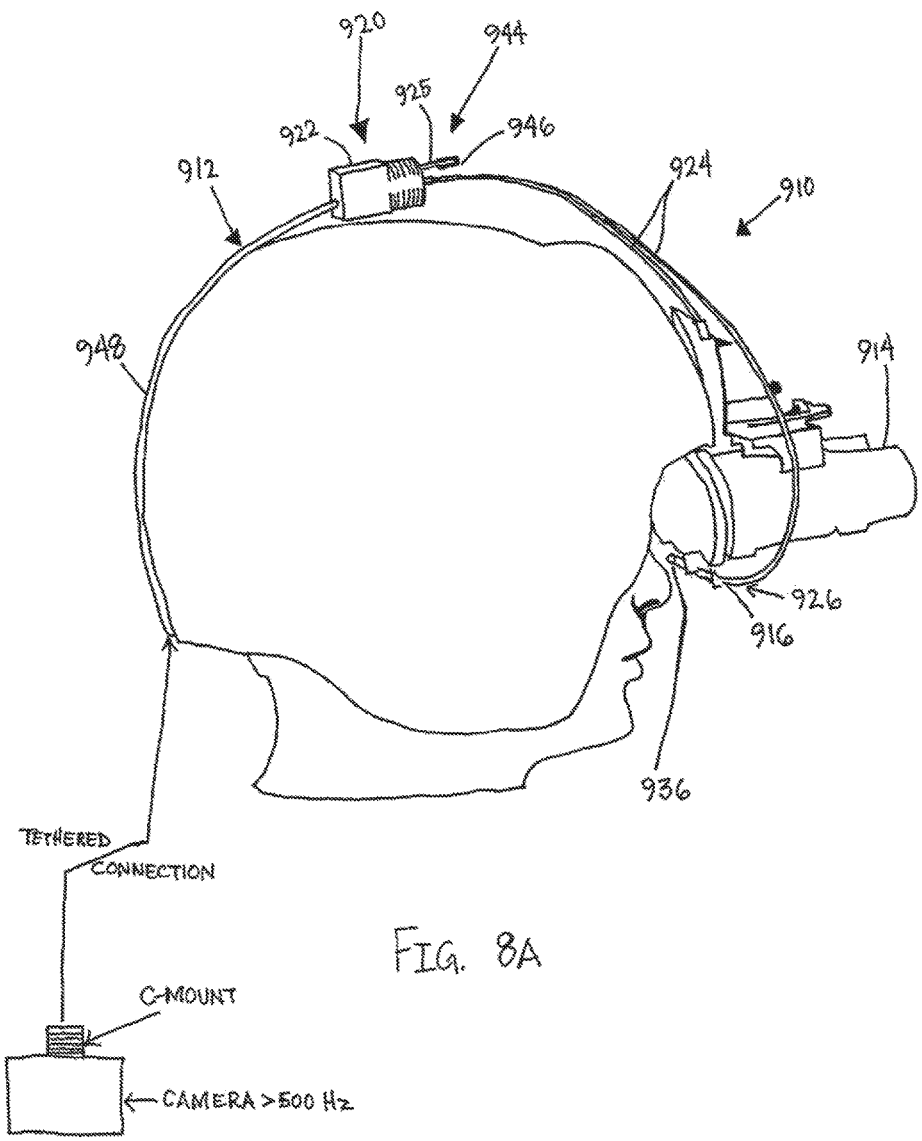
FIGS. 8A and 8B show another embodiment of an apparatus for monitoring eye movement incorporated into an aviator helmet.
Figure 8B:
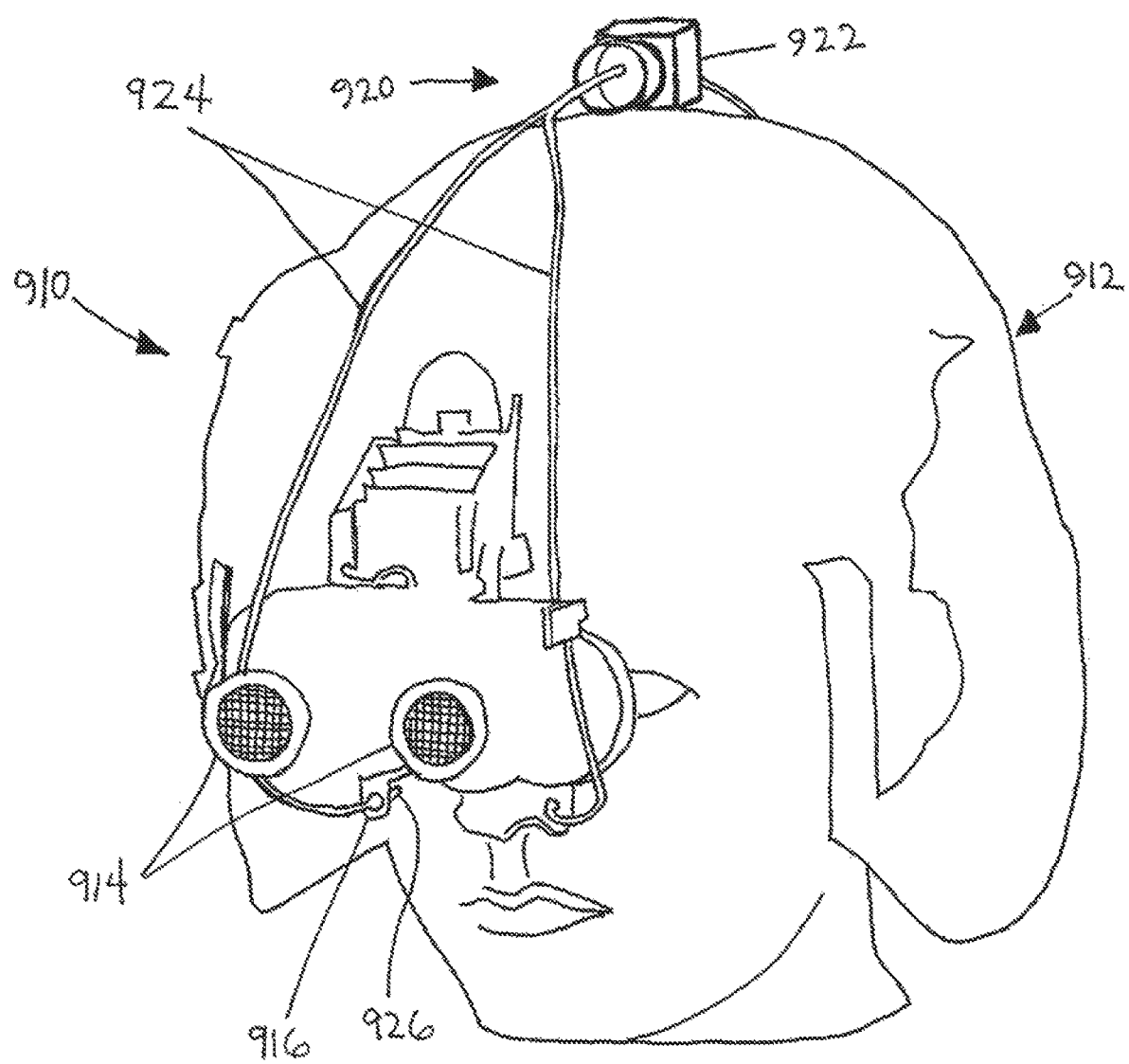

Turning to FIGS. 8A and 8B, another embodiment of an apparatus 910 is shown for monitoring eyelid movement of an individual wearing the apparatus 910. As described elsewhere herein, the apparatus 910 may be used as a biosensor, a communicator, and/or a controller, and/or may be included in a system, e.g., for monitoring voluntary-purposeful and/or involuntary-non-purposeful movement of one or both of the user's eyes.

As shown, the apparatus 910 includes a helmet 912 that may be worn on a user's head, and a biosensor assembly 920. The helmet 912 may be a standard aviator's helmet, such as those used by helicopter of jet aircraft pilots, e.g., including a pair of night vision tubes or other goggles 914 mounted thereon. Optionally, the helmet 912 may include one or more heads-up displays, e.g., smart flat-panel LCDs mounted front of or adjacent one or both eyes (not shown).

Figure 15:
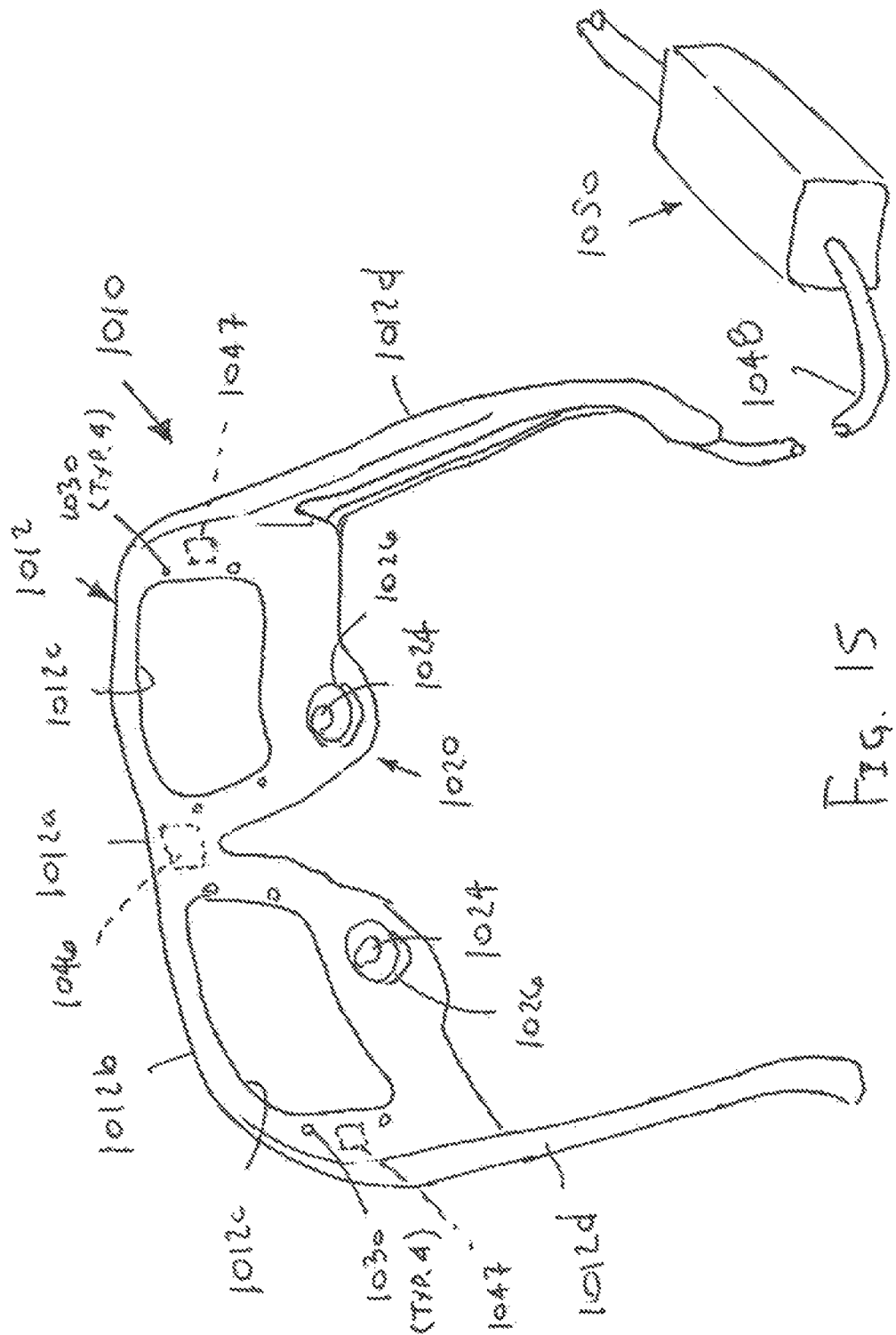
FIG. 15 is a perspective view of yet another embodiment of an apparatus for monitoring person based upon movement of the person's eye and/or eyelid.

Alternatively, the helmet 912 may be replaced with a frame or other device configured to be worn on a user's head. For example, FIG. 15 shows an exemplary embodiment of an apparatus 1010 that includes a frame 1012 and biosensor assembly 1020, as described further elsewhere herein. Generally, the frame 1012 includes a bridge piece 1012a, a rim extending above or around each eye 1012b defining an opening 1012c, and/or a pair of ear supports 1012d, similar to other embodiments described herein. The frame 1012 may include a pair of lenses (also not shown) mounted within or across the openings 1012c, such as prescription, shaded, and/or protective lenses, although they are not necessary for operation of the apparatus 1010. For example, the lenses may include blue or grey filters, polarized lenses, and the like. In an exemplary embodiment, the lenses may be selected to filter predetermined bandwidths of light that correspond to bandwidths detected by cameras 1024, e.g., to reduce oversaturation, glint, and the like from occurring in images acquired by the cameras 1024.

Alternatively, one or both lenses may be replaced with displays, e.g., relatively small flat panel LCDs, or may include regions upon which images can be projected, e.g., similar to a heads-up display (not shown), which may be used as a simulator and/or recreational device, a explained further below. In further alternatives, the apparatus herein may include other devices that may be worn on a user's head, such as a hat, cap, head band, head visor, protective eye and head gear, face mask, oxygen mask, ventilator mask, scuba or swimming mask, and the like (not shown).

The components of the apparatus 910 or 1010 may be provided at a variety of locations on the helmet 912 or frame 1012 (or other head-worn device), e.g., to generally minimize interference with the user's vision and/or normal activity while wearing the apparatus 910 or 1010, as described further elsewhere herein.

As shown in FIGS. 8A and 8B, the biosensor assembly 920 includes a camera 922 mounted on top of the helmet 912, e.g., using Velcro, straps, and/or other temporary or removable connectors (not shown). This may allow the camera 922 to be removed when not in use. Alternatively, the camera 922 may be substantially permanently connected to the helmet 912, incorporated directly into the helmet 912 (or other frame), connected to a head-mounted television, LCD monitor or other digital display, and the like, similar to other embodiments described herein.

The biosensor assembly 920 also includes one or more fiber optic bundles 924 that extend from the camera 922 to the front of the helmet 912 to provide one or more "endo-cameras" for imaging the user's eye(s). A pair of fiber optic bundles 924 are shown that extend from the camera 922 to respective tubes of the goggles 914. In the exemplary embodiment, the fiber optic bundles 924 may be sufficiently long to extend from the camera 922 to the goggles 914, e.g., between about twelve and eighteen inches long, although alternatively, the fiber optic bundles 924 may be longer, e.g., between about two and four feet long, or shorter, depending upon the location of the camera 922 on the helmet 910 (or if the camera 922 is provided separately from the helmet 910).

Ends 926 of the fiber optic bundles 924 may be permanently or removably attached to the goggles 914, e.g., to brackets 916 connected to or otherwise extending from the goggles 914. Alternatively, the fiber optic bundles 924 may be held temporarily or substantially permanently onto the goggles 914 using clips, fasteners, adhesives, and the like (not shown). As shown, the ends 926 of the fiber optic bundles 924 are mounted below the goggles 914 and angled upwardly towards the eyes of the user. The angle of the ends 926 may be adjustable, e.g., about fifteen degrees up or down from a base angle of about forty five degrees. Alternatively, the ends 926 of the fiber optic bundles 924 may be provided at other locations on the helmet 912 and/or goggles 914, yet be directed towards the eyes of the user.

With additional reference to FIG. 9, each fiber optic bundle 924 may include a fiber optic image guide 928, i.e., a bundle of optical imaging fibers, and an illumination fiber bundle 930, e.g., encased in shrink tubing (not shown), extending between the camera 922 and the ends 926 of the fiber optic bundle 924. Each illumination fiber bundle 930 may include one or more optical fibers coupled to a light source, e.g., within the camera 922. For example, the camera 922 may include a hell emitting diode (LED) housing 932 including one or more LEDs 934 (one shown for simplicity), and the illumination fiber bundle(s) 930 may be coupled to the LED housing 932 to deliver light to the end(s) 926.

The light emitted by the light source 934 may be outside the range of normal human vision, for example, in the infrared range, e.g., with a nominal output wavelength between about eight hundred forty and eight hundred eighty nanometers (840-880 nm), such that the light emitted does not interfere substantially with the user's normal vision. The light source may generate light substantially continuously or light pulses at a desired frequency, similar to the embodiments described elsewhere herein. For example, a controller (not shown) may be coupled to the light source(s) 934 to adjust one or more of the frequency, duration, and/or amplitude of pulses emitted, it desired.

Alternatively, other sources of light for illuminating the face and/or one or both eyes of the user may be provided instead of the illumination fiber bundle 930. For example, similar to the embodiments described elsewhere herein, one or more emitters (not shown) may be provided, e.g., an array of emitters disposed along one or more regions of the helmet 912 and/or goggles 914.

The end 926 of each fiber optic bundle 924 may include one or more lenses, e.g., an objective lens 936 (shown in FIG. 8A) that may focus the image guide 928 in a desired manner, e.g., towards an eye of the user. Each image guide 928 may have forward line of sight (zero degrees (0°) field of view) and the objective lens 936 may provide a wider field of view, e.g., about forty five degrees (45°). Optionally, the line of sight may be adjustable, e.g., between about thirty and sixty degrees (30-60°) by adjusting the objective lens 936. Further, the objective lens 936 may optimize the viewing distance, e.g., to about two inches (2 in.), thereby improving focus on the user's eye(s). Thus, the image guide(s) 928 may carry images of the user's eye(s) through the fiber optic bundle(s) 924 to the camera 922.

As shown in FIG. 9, the camera 922 may include one or more lenses, e.g., a magnification section 938, for delivering and/or focusing images from the image guide(s) 928 (and/or camera 944) onto the active area 942 of the imaging device 940. The imaging device 940 may be a variety of known devices that provide a two-dimensional active area for receiving images, e.g., a CMOS or CCD detector. In an exemplary embodiment, the imaging device 940 may be a CMOS device, such as that made by Sensovation, Model cmos SamBa HR-130, or Fast Camera 13 made by Micron Imaging, Model MI-MV13. The magnification section 938 may be mechanically mated to the camera 922 via a C-mount or other connection (not shown).

In an exemplary embodiment, each image guide 928 may be capable of providing as many as ten to fifty thousand (10,000 to 50,000) pixel of image data, e.g., similar to the fiber optic bundles described elsewhere herein, which may be projected onto the active area 942 of the imaging device 940. For the apparatus 910 shown in FIGS. 8A and 8B, the images from both fiber optic bundles 924 are projected onto a single imaging novice 940, as shown in FIG. 9, i.e., such that the images from each of the user's eyes occupy leas than half of the active area 942.

Optionally, the apparatus 910 may include an "exo-camera" 944 oriented away from the user's head, e.g., to monitor the user's surroundings, similar to the embodiments described elsewhere herein.

For example, as shown in FIG. 8A, another fiber optic bundle 945 may be provided that extends from the camera 922. As shown, the fiber optic bundle 945 is oriented "forward," i.e., generally in the same direction as when the user looks straight ahead, and terminates in a micro lens 946. This fiber optic bundle 945 may be relatively short and/or substantially rigid such that its field of the view is substantially fixed relative to the helmet 912. Alternatively, the exo-camera 944 may be provided at other locations on the helmet 912 and/or goggles 914, e.g., including a flexible fiber optic bundle, similar to the exo-camera 840 described above. Thus, the exo-camera 944 may provide images away from the user, e.g., straight ahead of the user's face.

The exo-camera 944 may or may not include one or more illumination fibers, but may include an image guide that may be coupled to the imaging device 940, e.g., via the magnification section 938 or separately. Thus, the images from the exo-camera 944 may be delivered onto the same active area 942 as the images of each of the user's eyes received from the image guides 928, similar to other embodiments described herein. This configuration may allow or facilitate temporal and/or spatial synchronization, allowing for overlaying or superimposing endo-camera image(s) over exo-camera images, or through "triangulation measurements" or other algorithms for eye tracking purposes to identify "where," "what," and/or "how long" (duration of gaze) the user's eyes are looking at relative to the user's head directional position.

Thus, the camera 922 may simultaneously capture images from one or more "endo-cameras," i.e., from fiber optic bundles 924 and from the exo-camera 944. This may ensure that the images captured by each device are synchronized with one another, i.e., linked together in time such that an image of one eye taken at a specific time correspond to an image of the other taken at substantially the same time. Further, these images may be substantially synchronized with data from other sensors, e.g., one or more physiological sensors, which may enhance the ability to monitor and/or diagnose the user, and/or predict the user's behavior. Because of this synchronization, image data may be captured at relatively high rates, e.g., between about five hundred and seven hundred fifty frames per second or Hertz (500-750 Hz). Alternatively, separate detectors may be provided, which capture image data that may be synchronized, e.g., by a processor receiving the data. In this alternative, slower capture rates may be used, e.g., between about thirty and sixty Hertz (30-60 Hz), to facilitate synchronization by a processor or other device subsequent to capture. Optionally, the camera 922 and/or associated processor may be capable of capturing relative slow oculometrics, e.g., at rates of between about fifteen and sixty (15-60) frames per second.

FIGS. 10A and 10B illustrate exemplary outputs from a camera receiving simultaneous image signals from two endo-cameras 2010 and an exo-camera 2020 (or from a device compiling images from separate cameras and/or detectors). As shown, an endo-camera is directed towards each of the user's eyes, and the exo-camera is directed outwardly at the user's surroundings (i.e., generally straight in front of the user's face). In FIG. 10A, both of the user's eyes 2010L, 2010R are open and the exo-camera image 2020 shows a horizontal view of the room ahead of the user. In contrast, in FIG. 10B, one of the user's eyes 2010L is completely closed, and the other eye 2010R is partially closed such that the eyelid covers most of the pupil. The exo-camera image 2020 shows that the user's head has begun to tilt to the left and droop forward.

Returning to FIGS. 8A, 8B, and 9, the images from the camera 922 (and/or camera 944) may be transferred from the apparatus 910 via cable 948 (best seen in FIG. 8A). For example, the imaging device 940 may convert the optical images from the active area 942 into electrical signals that may be carried via the cable 948 to one or more processors and/or controllers (not shown), similar to other embodiments described elsewhere herein. Alternatively, images from the fiber optic bundles 924 and/or exo-camera 944 may be carried from the apparatus 910 to one or more remote devices, e.g., camera, detector, and/or processor (not shown), similar to other embodiments described herein. In this alternative, the bandies 924 may be between about two and six feet long, e.g., providing sufficient length to allow the user to move normally yet remain coupled to the remote device(s).

Alternatively or in addition, the apparatus 910 may include a wireless transmitter (not shown), such as a short or long range radio frequency (RF) transmitter, e.g., using Bluetooth or other protocols, that may be coupled to the camera 922. The transmitter may be located in the camera 922 or elsewhere on the helmet 912. The transmitter may transmit image signals representing the image data to a receiver at a remote location, similar to other embodiments described elsewhere herein. In yet another alternative, the apparatus 910 may include memory (also not shown) for storing the image data, either instead of or in addition to the transmitter and/or cable 948. For example, the data may be stored in a recorder device, e.g., similar to a "black box" recorder used in aircraft such that the recorder may be retrieved at a later time, e.g., for analysis after a vehicular accident, medical incident, and the like.

Optionally, the apparatus 910 may include one or more controllers (not shown), e.g., within the camera 922, and/or on or in the helmet 912 for controlling various components of the apparatus 910. For example, a controller may be coupled to the one or more LEDs 934 such that the LEDs 934 emit light at a predetermined pulses or variable pulses, for example, varying one or more of frequency, duration, and/or amplitude of the pulses, e.g., to reduce energy consumption of the apparatus 910. In addition, the apparatus 910 may include one or more power sources, e.g., batteries and/or cables, for providing electrical power to one or more components of the apparatus 910. For example, one or more batteries (not shown) may be provided in the camera 922 for providing power to the imaging device 940 and/or the LED(s) 934.

Turning to FIG. 15, an alternative biosensor assembly 1020 is shown, which may be provided on any of the other embodiments described herein and/or may, optionally, include any of the components of the other embodiments described herein. Unlike the assembly 920, a plurality of light sources 1030 are provided at several locations on the frame 1012. For example, each light source 1030 may include a light emitting diode configured for emitting a relatively narrow or wide bandwidth of the light, e.g., infrared light at one or more wavelengths between about 640-700 nanometers, broadband visible light, e.g., white light, and the like. The light sources 1030 may include lenses, diffusers, or other features (not shown), e.g., for lighting the user's eye and/or face, similar to the other embodiments herein. The light sources 1030 may be spaced apart from one another, e.g., in one or mom vertical arrays or in other arrays located around respective openings 1012c in the frame 1012.

Figure 16:
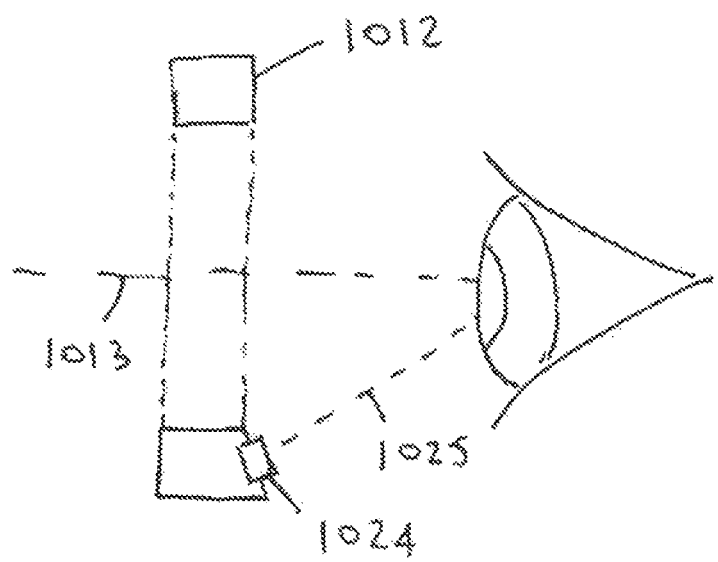
FIG. 16 is detail showing the apparatus of FIG. 15 acquiring images of an eye of a person wearing the apparatus.

In addition, individual micro-cameras 1024, 1046 may be provided for monitoring one or both eyes of the user and, optionally, monitoring the user's surroundings. For example, as shown, a CMOS, CCD, or other detector 1024 may be provided on the frame 1012, e.g., below each opening 1012c, such the detector 1024 is oriented to and eye of a user wearing the apparatus 1010. As shown in FIG. 16, each detector 1024 may be offset from the respective opening 1012c in the frame 1012, e.g., to place the detector 1024 away from the general viewing field of a person wearing the frame. For example, as shown, the frame may generally define an eye-gaze axis 1013 extending through the opening 1012c, e.g., orthogonal to a plane generally defined by the frame 1012. The eye-gaze axis 1013 may correspond to a direction in which a person wearing the frame looks when looking straight ahead through the opening 1012c. The detector 1024 may be mounted to the frame 1012 such that a centerline imaging axis 1025 of the detector 1024, e.g., identifying a center of the field of view of the active area of the detector 1024, is offset from the eye-gaze axis 1013. In one embodiment, the eye-gaze axis 1013 and centerline imaging axis 1025 may intersect one another, e.g., before or after adjusting the orientation of the detector 1024, thereby defining an acute angle between the axes.

For example, each detector 1024 may be provided in a swivel mourn 1026 that may allow adjustment of the orientation of the detector 1024. One or more lenses, filters, and the like (not shown) may also be secured to the swivel mount 1026 over the detector 1024 or secured directly to the detector 1024, e.g., over its active area, similar to the camera 922.

The swivel mount(s) 1026 may be adjustable about one or more axes, e.g., rotatable about a pivot axis oriented towards a user's eye or face, e.g., diagonally upwardly and away from the frame 1012, such as the centerline imaging axis 1025. The swivel mount 1026 may allow adjustment of the orientation of the detector 1024, e.g., to center the eye of an individual user within the active area of the detector 1024. The swivel mourn 1026 may include set screws, mating threads, a collar, and/or other features (not shown) for selectively locking the swivel mount 1026 (and consequently the detector 1024) in a desired orientation, yet allowing the swivel mount 1026 to be released and adjusted, as needed.

The detector 1024 may include a lens (not shown) for focusing images onto the active area of the detector 1024. Optionally, a filter (not shown) may be provided on the detector 1024, e.g., for filtering undesired wavelengths of light from images obtained by the detector 1024. For example, the filter may reduce the intensity or completely remove visible light and/or ultraviolet light otherwise received on the active area of the detector 1024, which may otherwise create a glint or other undesired artifacts on images, may saturate the detector 1024, and the like.

In addition or alternatively, tinted lenses may be provided on the frame 1012 to filter undesired bandwidths of external light that may otherwise create glints or other artifacts on images of the eye, as described elsewhere herein. For example, the lenses may statically or dynamically reduce light intensity or remove desired wavelengths of light during use, which may otherwise cause undesired reactions by the pupil, eyelid, or other structures of the eye being monitored.

In a further alternative, the detector 1024 may be configured only for capturing images within a desire bandwidth of light, e.g., infrared light of wavelengths between about 640-700 nanometers.

In addition, one or more exo-cameras 1046, 1047 may be provided on the frame 1012 for acquiring images of the surroundings of the person wearing the apparatus 1010. As shown, a first detector 1046 is mounted to the bridge piece 1012*a* of the frame 1012 and oriented away from the user, similar to previous embodiments. The detector 1046 may be fixedly mounted to the frame 1012, or may be adjustable, e.g., including a swivel mount, a bendable tip, and the like, similar to the other detectors or cameras herein.

Optionally, a pair of detectors 1047 may be provided, e.g., on the left and right side of the rim 1012*b*, e.g., in addition to or instead of the detector 1046. For example, the left and right detectors 1047 may facilitate triangulation or other identification of objects in images acquired by the detectors 1047 in three dimensions.

The exo-cameras 1046, 1047 may have similar or different fields of view, resolutions, focal lengths, or other features, as desired. For example, different exo-cameras may have relatively wider or narrower fields of view, may extend along different axes for acquiring images of different areas surrounding the person wearing the frame, and/or may include higher and lower relative resolutions, focal lengths, and the like. For example, a relatively low resolution, wide angle first detector may be used on conjunction with a relatively high resolution, narrow angle second detector, e.g., such that images from the first detector may be used for general analysis, while images from the second detector may be used when higher granularity is desired. In addition or alternatively, the first and second detectors may have different focal lengths, e.g., such that one acquires images of objects or scenes closer than the other.

Each detector 1024, 1046 may be coupled to an individual cable, set of wires, and the like, such that signals generated by the respective detector 1024, 1046, i.e., corresponding to images received on the active area of the detector 1024, 1046 are communicated away from the detector 1024, 1046. For example, as shown in FIG. 15, a cable 1048 may extend from the frame 1012 that includes individual cables or sets of wires coupled to the detectors 1024, 1046. The cable 1048 may also include individual cables or sets of wires coupled to respective light sources 1030. The individual cables or sets of wires may be embedded in the frame 1012, e.g., along the rim 1012*b* from the respective detector 1024, 1046 or light source 1030 until captured within the cable 1048, e.g., to reduce the overall profile of the apparatus 1010, as desired.

The cable 1048 may extend to a processor box 1050 separate from the frame 1012, e.g., similar to other embodiments herein. For example, the processor box 1050 may include one or more controllers or processors for controlling the light sources 1030, memory or storing image signals from the detectors 1024, 1046, and the like. In addition, the processor box 1050 may include one or more power sources, e.g., for operating the components of the apparatus 1010. Alternatively, one or more processors, power sources, and the like may be provided on the frame 1012, similar to other embodiments herein. Optionally, the frame 1012 may also include one or more transmitters and/or receivers (not shown) for transmitting data, receiving instructions, and the like, one or more sensors (also not shown), and/or other components, similar to other embodiments herein.

A system including the apparatus 910 (or 1010) may include components that are remote from the apparatus 910, similar to other embodiments described elsewhere herein. For example, with reference to the apparatus 910 of FIGS. 8A and 8B (but with equal application to the apparatus 1010), the system may include one or more receivers, processors, and/or displays not shown) at a remote location from the apparatus 910, e.g., in the same room, at a nearby monitoring station, or at a more distant location. The receiver may receive signals transmitted by a transmitter on the apparatus 910, including image signals from the camera 922 and/or signals from other sensors on the apparatus 910.

A processor may be coupled to the receiver for analyzing signals from the apparatus 910, e.g., to prepare the signals for graphical display. For example, the processor may prepare the video signals from the camera 922 for display on a monitor, similar to the images shown in FIGS. 10A and 10B, thereby allowing the user to be monitored by third parties, e.g., medical professionals, supervisors or other co-workers, and the like. Simultaneously, other parameters may be displayed, either on a single monitor or on separate displays, similar to other embodiments described elsewhere herein. The processor may superimpose or otherwise simultaneously display video signals of the user's eyes and/or exo-camera images, alone or in conjunction with the other sensed parameters, to allow a physician or other individual to monitor and personally correlate these parameters to the user's behavior.

Figure 11A:
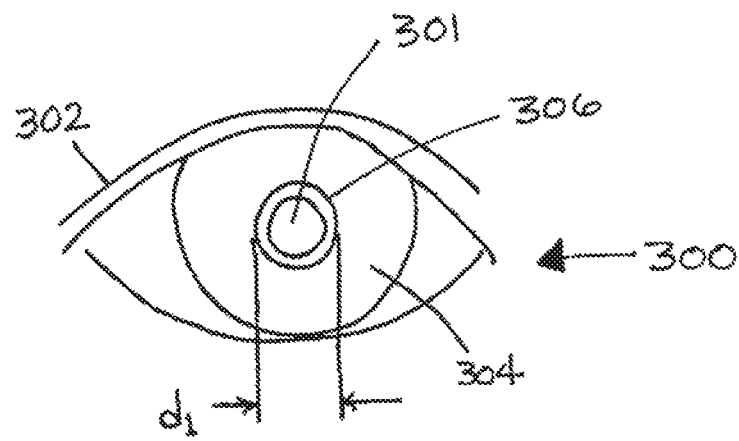
FIGS. 11A-11C are graphical displays, showing an elliptical graphic being created to identify a perimeter of a pupil to facilitate monitoring eye movement.
Figure 11B:
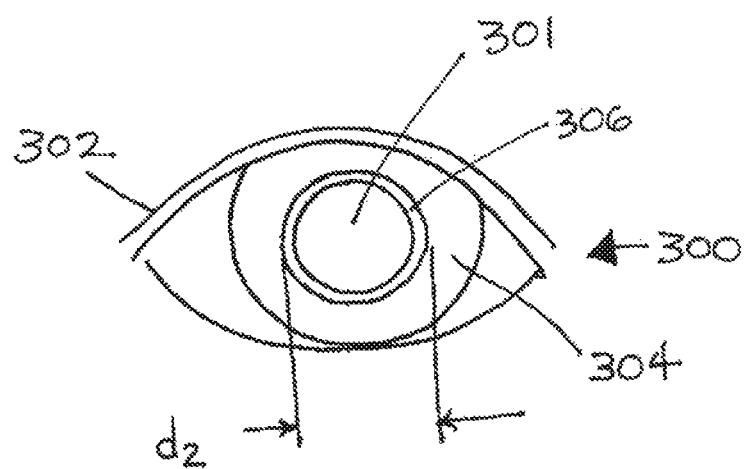
Figure 11C:
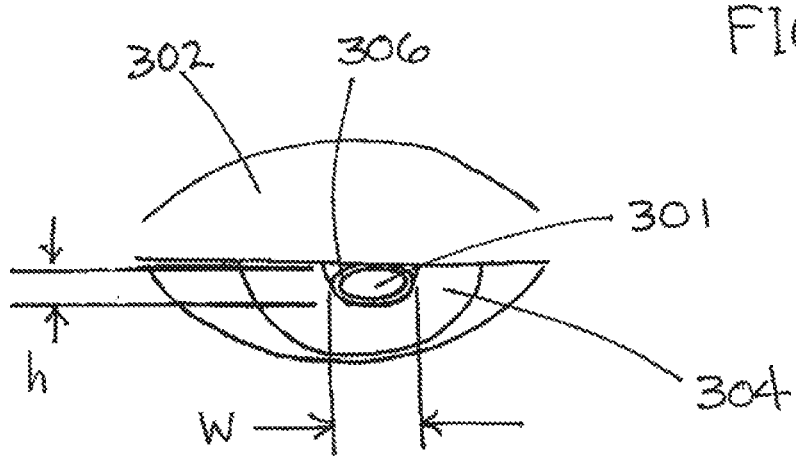

In addition, turning to FIGS. 11A-11C, a processor may superimpose a graphic on the display, e.g., onto the video images to facilitate identifying and/or monitoring the pupil 301 of an eye 300. As shown, because of the contrast between the edge of the pupil 301 and the surrounding iris 304, the processor may approximate this border, and create a graphic halo, ellipse, or other graphic 306 that may be superimposed on the image data of one or both eyes (only one eye 300 shown in FIGS. 11A-11C for simplicity). An observer may use this graphic 306 to facilitate monitoring the user of the apparatus 910.

In addition or alternatively, the processor may determine the size and/or shape of the halo virtually to facilitate monitoring the user without actually displaying the halo on a display. For example, the processor may identify the edges of the pupil 301 and determine the size and shape of the pupil 301 based on the identified edges without actually displaying a halo. Thus, the processor may determine the cross-sectional area or diameter of the halo 306 anti/or pupil 301 in real time. In addition or alternatively, the processor may use the size and/or shape to identify a center of the halo 306 or pupil 301, to thereby determine coordinates of the center of the halo 306 or pupil 301, e.g., in an x-y coordinate system In addition or alternatively, the processor may automatically analyze the information regarding the size and/or shape of the pupil 301 (or the graphic 306), thereby correlating the video signals to determine the person's level of drowsiness or other physical and/or mental condition. This analysts may include monitoring the relative location of the pupil, a size of the pupil, and/or an eccentricity of the pupil, e.g., over time. For example, the processor may monitor the diameter of the pupil 300 over time, which ma be displayed in chart form, e.g., stored in memory as a function of time, and/or superimposed on images of the eye, e.g., in real time.

For example, FIG. 11A may show the pupil 301 in a relaxed state under ambient conditions, e.g., corresponding to graphic 306 having a diameter "$d_1$". As shown in FIG. 11B, if the user blinks or closes the eye 300, the pupil 301 may dilate, such that the pupil 301 is initially dilated when the eye 300 is reopened, as represented by graphic 306 having a diameter "$d_2$." The processor may compare changes in diameter of the graphic 306 or the pupil 301 itself to determine the delay for the pupil 301 to return to the diameter "$d_1$" after a blink or other eye closure. This delay or loss of reactivity to visible or invisible light flashes may at least partially indicate a level of drowsiness, a level of impairment, e.g., intoxication, and/or the onset of a medical event, including lethal or terminal events such as brain damage or brain death due to hypoxemia, hypoglycemia, stroke, myocardial infarction, toxins, poisons, and the like.

In addition or alternatively, the processor may determine the approximate eccentricity of the pupil, e.g., as it is partially covered by the eyelid 302. For example, as shown in FIG. 11C, when the eyelid 302 is partially closed, the halo 306 superimposed on the images (or otherwise determined virtually by the processor without actually being displayed) may adopt an elliptical shape corresponding to a width "w" and height "h" of the exposed portion of the pupil 301. The height "h" may be related to the diameter "$d_1$," i.e., the ratio of the height "h" to diameter "$d_1$" may be equal to or less than one ($h/d_1 \geq 1$), as an indicator of the degree that the eyelid 302 covers the pupil 301. For example, this ratio may reduce from one to zero once the pupil 301 is completely covered by the eyelid 302.

Similarly, the width "w" may also be related to the diameter "$d_1$" ($w/d_1 \geq 1$), as an indicator of the degree that the eyelid 302 covers the pupil 301, e.g., as the eyelid 302 begins to cover more than half of the pupil 301. In addition or alternatively, a ratio of the height and width ($h/w \geq 1$) may relate information on eccentricity of the pupil 301, e.g., based upon coverage by the eyelid 302. Similarly, the area of the pupil 301 (e.g., within the halo 306) may be calculated and monitored. Such parameters may be analyzed individually, collectively, and/or along with other oculometric and/or physiological parameters to monitor, analyze and/or predict future behavior of the user.

Figure 12A:
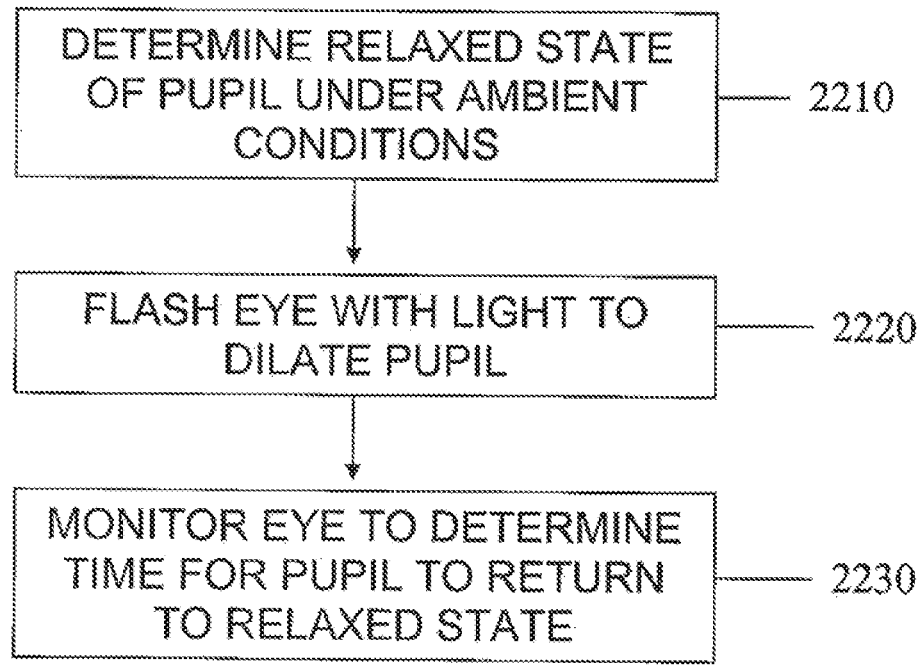
FIGS. 12A and 12B are flowcharts, showing a method for vigilance testing a person wearing an apparatus tor monitoring movement of the person's eyes.
Figure 12B:
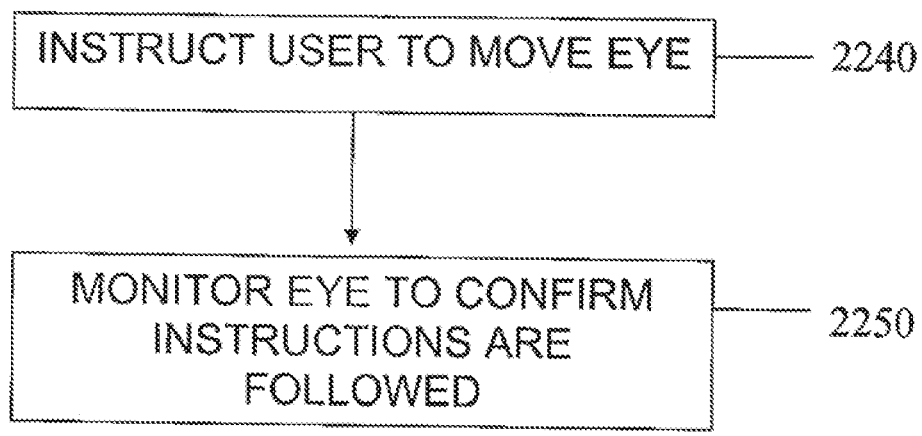

Turning to FIG. 12A, an exemplary method is shown for testing the vigilance of a user of any of the apparatus and systems described herein. For example, a user may wear the apparatus 810 shown in FIG. 8 monitoring one or both of the user's eyes, as described further above. At step 2210, base or parameters of the user's eye(s) may be determined under a related state. For example, the relaxed diameter of the pupil may be measured or otherwise monitored under ambient conditions.

At step 2220, one or more pulses of light may be emitted towards the eye(s), which may cause the eye(s) to dilate and/or constrict from the relaxed state, e.g., at substantially the same frequency as the frequency of pulsed light flashes. For example, one or more emitters on the apparatus 810 may be activated in a predetermined sequence to cause the eye(s) to dilate. Thereafter, in step 2230, the eye(s) of the user may be monitored, e.g., subconsciously or unconsciously with the camera 830 or sensors 822, to determine the reaction time of the eye to return to the relaxed state. The reaction time may be compared to an empirical database or other data to confirm that the user is conscious, awake, and/or alive. If desired, steps 2220 and 2230 may be repeated one or more times to confirm the reaction time and/or provide an average reaction time, if desired, e.g., to avoid false negative determinations.

It may be sufficient, e.g., during a threshold test, to generate a single flash of light and monitor the pupil's response. Alternatively, a series of flashes may be used to monitor pupillary response over time, e.g., to study trends or eliminate false data that may arise from a single flash. For a series of flashes, the pulse rate should be longer than the time the pupil takes to naturally return to its relaxed state after dilating in response to a flash of light, e.g., at least between about fifty and one hundred milliseconds (50-100 ms). Alternatively pulses of light, e.g., near-infrared light (having wavelengths between about 640-700 nanometers) may be directed at the user's eye(s). The system may detect rhythmic fluctuations in pupillary response. Such responses may result from a primitive oculometric response, possibly relating to night vision, e.g., "seeing" in the dark or sensing infrared light sources in the dark.

Such papillary response testing may also be used to identity false positives, e.g., when a user has died, yet the system fails to detect any eye closure and/or movement. Similarly, pupillary response testing may also be able to determine whether a user is asleep or unconscious. In addition, pupillary response testing may be used to determine whether a user is under the influence of alcohol, drugs, and the like, which may affect the rate at which the pupil constricts back to its relaxed state after dilating in response to flashes of light. In addition or alternatively, pupillary response testing may also be used to determine the blood concentration or amount of drug or alcohol in the user's body depending on correlation between oculometric measures and corresponding scientifically-determined blood levels.

Turning to FIG. 2B, another method for testing threshold vigilance is shown. This method generally involves providing stimuli instructing the user to deliberately move their eye(s) in a desired manner, at step 2240, and monitoring the eye at step 2250, e.g., for deliberate movement confirming that the user has followed the instructions and moved their eye(s) in the desired manner. Any of the apparatus described herein may include one or more stimulus devices, e.g., speakers, lights, vibratory or other tactile devices. Alternatively, such devices may be provided remotely from the user, e.g., on a dashboard of a vehicle, a video display, and the like.

For example, a user may be instructed to close their eye(s) for a predetermined time if a visible light on the apparatus is activated. Once the light is activated, the system may monitor the eye(s) to confirm that the user responds within a predetermined time frame and/or in a predetermined manner (e.g., one or more blinks in a predetermined sequence). Alternatively, other stimuli may be provided instead of light flashes, such as visible instructions on a display (on or separate from the apparatus), audible signals (e.g., verbal commands from a speaker on or near the device), tactile signals, and the like. In these embodiments, the user may be instructed to perform a series of actions, e.g., looking up or down, left or right, blinking in a desired sequence, closing their eye until instructed, following a pointer on a display, and the like. Such testing may be useful to confirm, for example, whether a test subject is awake, aware, and/or alert during a series of tests or while performing various activities.

In another embodiment, apparatus and systems, such as those described elsewhere herein, may be used to control a computer system, e.g., similar to a computer mouse, joystick, and the like. For example, with reference to the apparatus 810 shown and described with reference to FIG. 3, the camera(s) 830 may be used to monitor the location of the user's pupil(s) to direct and/or activate a mouse pointer on a computer screen or other display. A processor receiving the image data from the camera 922 may analyze the image data to determine the relative location of the pupil(s) within the active area 942 of the detector 940. Optionally, one or more displays may be fixed relative to the frame 812 disposed in front of or within the field of view of one or both of the user's eyes. For example, a flat panel LCD or other display (not shown) may be mounted to the frame 812 in place of lenses. Such an apparatus may be used for stimulations, e.g., within a medical or other research facility, for recreational use, e.g., as a video game console, and the like.

Figure 13:
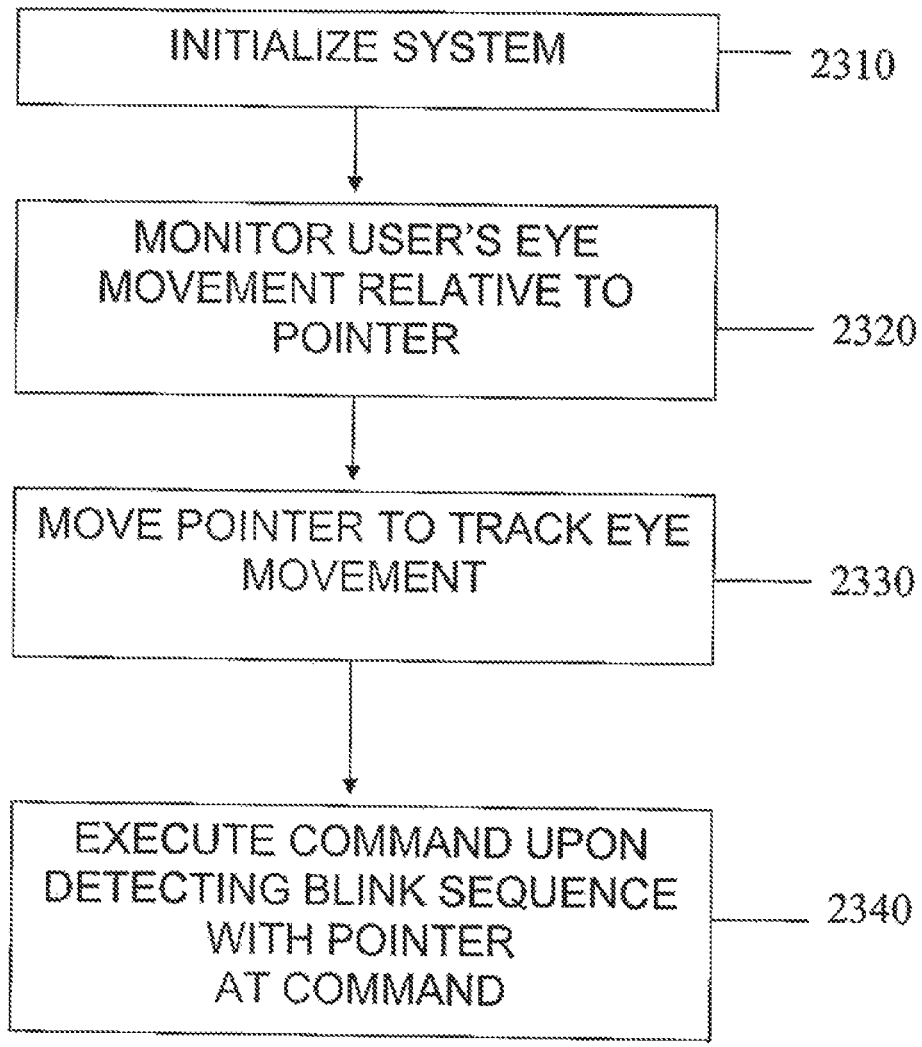
FIG. 13 is a flowchart, showing a method for controlling a computing device based upon movement of an eye.

Turning to FIG. 13, an exemplary method is shown for controlling a computing device based upon detected eye movement using any of the apparatus or systems described herein. For example, the apparatus 910 shown in FIG. 8A may be used that includes a fiber-optic bundle 924 for imaging one or both eyes of the user. Optionally, as explained further below, the apparatus may also carry one or more exo-cameras, e.g., disposed adjacent one or both eyes of the user that may be oriented outwardly along the user's forward view. First, at step 2310, it may be desirable to initialize a system including such an apparatus, i.e., establish a reference frame, such as a base or reference location, a reference frame with orthogonal components, and the like. For example, the user may be instructed to look at a pointer or other predetermined location on the display, thereby maintaining the user's eye(s), and consequently the user's pupil(s) substantially stationary. The processor may analyze the image data from the camera 830 while the user's eye(s) are substantially stationary, e.g., to determine the location of the pupil on the images that corresponds to the reference point or "base location." For example, the pointer base may be located substantially straight ahead of the user's pupil. Optionally, the user may be instructed to look sequentially at two or more identified locations on the display, thereby providing a scale for relative movement of the user's eye. In this alternative, it may be desirable to have the user look at opposite corners of the display, e.g., to identify the limits of appropriate eye movement relative to the display.

Once initialization is complete, the user may be free to move their eye(s), e.g., left and right, up and down, e.g., relative to the pointer and/or the rest of the display. At step 2320, the system may monitor such movement of the eye, i.e., the processor may analyze the image data to determine the relative location of the user's pupil(s) from the base location(s). For example, if the user moves his/her eye(s) up and right from the base location, i.e., up and right relative to the pointer on the computer screen, the processor may determine this movement. In response, at step 2330, the processor may move the pointer up and right, i.e., thereby tracking the user's gaze. When the user stops moving his/her eye(s), the processor may stop the pointer once it arrives a the location where the user is currently looking on the display.

Optionally, at step 2340, the user may be able to execute a command once the pointer has moved to a desired location on the display, e.g., similar to activating button on a mouse. For example, the processor may monitor the image data for a signal from the user, e.g., one or more purposeful blinks in a predetermined sequence. This may be as simple as a single blink of a predetermined duration, e.g., several seconds long, to a more complicated series of blinks, e.g., including one of both of the user's eyes. Alternatively, the signal may be a predetermined period with no blinks, e.g., three, five, or more seconds long. When the processor identifies the signal, the processor may activate the command. For example, the user may stop moving their eye(s) when it reaches an icon, word command, and the like on the display, and the processor may move the point until it overlies or otherwise is located at the icon or command. The user may then blink or act, as explained above, similar to a "double-click" of a button on a computer mouse, thereby instructing the processor to complete the selected command or communicate the selected command to a desired destination. For example, the selected command may result in a computer program being executed, or a piece of equipment or other device being activated, deactivated, or otherwise controlled in a desired manner. Thus, the system may be used to complete a variety of tasks, from controlling a computer device coupled to the processor and/or display, to turning on or off a light switch or vehicle. Such apparatus and/or systems may thereby provide methods for using a computer hands-free, i.e., using only movement of the user's eye(s).

For example, in one application, the system may be used to operate a vehicle, such as a helicopter, jet, or other aircraft, e.g., to activate or otherwise control weapons, navigational, or other onboard systems. In another application, the system may be used in a video game or other simulation, e.g., to enhance virtual reality immersion. For example, the system may allow a user to quickly navigate through multiple menus, scenes, or other activities, while leaving the user's hands free to perform other functions, e.g., perform other activities in addition or simultaneously with eye-controlled functions, which may allow more and/or more complicated tasks at the same time.

In addition, one or more exo-cameras may be used to enhance and/or otherwise facilitate tracking eye movement relative to the pointer on the display. For example, an exo-camera may be provided adjacent at least one eye, e.g., at a predetermined distance or other relationship from the eye, that is oriented towards the display. Thus, the exo-camera may provide images of the display, e.g., showing movement of the pointer in real time that may be synchronized with movement of the eye monitored with the endo-camera. The processor may relate this data using triangulation or other algorithms to enhance accuracy of tracking the pointer with eye movement. This may ensure the accuracy that, when the user intends to execute a command by blinking with the pointer on a command, the intended command is actually selected, e.g., when the display shows multiple available commands.

In an alternative embodiment, the processor may receive and process video signals from the endo-camera to identify edges of a pupil of the eye based on the endo-camera images, and use the identified edges to approximate coordinates of the pupil relative to a reference frame of the endo-camera images. For example, the processor may assign an x-y coordinate system to the endo-camera images and use the edges of the pupil to identify the center of the pupil within this coordinate system. The processor may also receive and process images from the exo-camera and correlate the coordinates obtained from the endo-camera images with the exo-camera images of the person's surroundings to approximate a location at which the person wearing the device is looking relative to the person's surroundings.

For example, a display (not shown) may be coupled to the processor for displaying the exo-camera images, and the processor may superimpose a graphic, e.g., a set of crosshairs, cursor, and the like, on the exo-camera images shown on the display to identify the approximated location at which the person is looking. If the display is a computer display shown to the person weaving the apparatus, e.g., external to the apparatus or incorporated into the frame, the person may use the graphic to navigate on the display. For example, the person may move the cursor to an object shown on the display and "click" on the object, e.g., by blinking or staring for a predetermined duration, to request an action, such as to request identification or additional information regarding the object.

Figure 14:
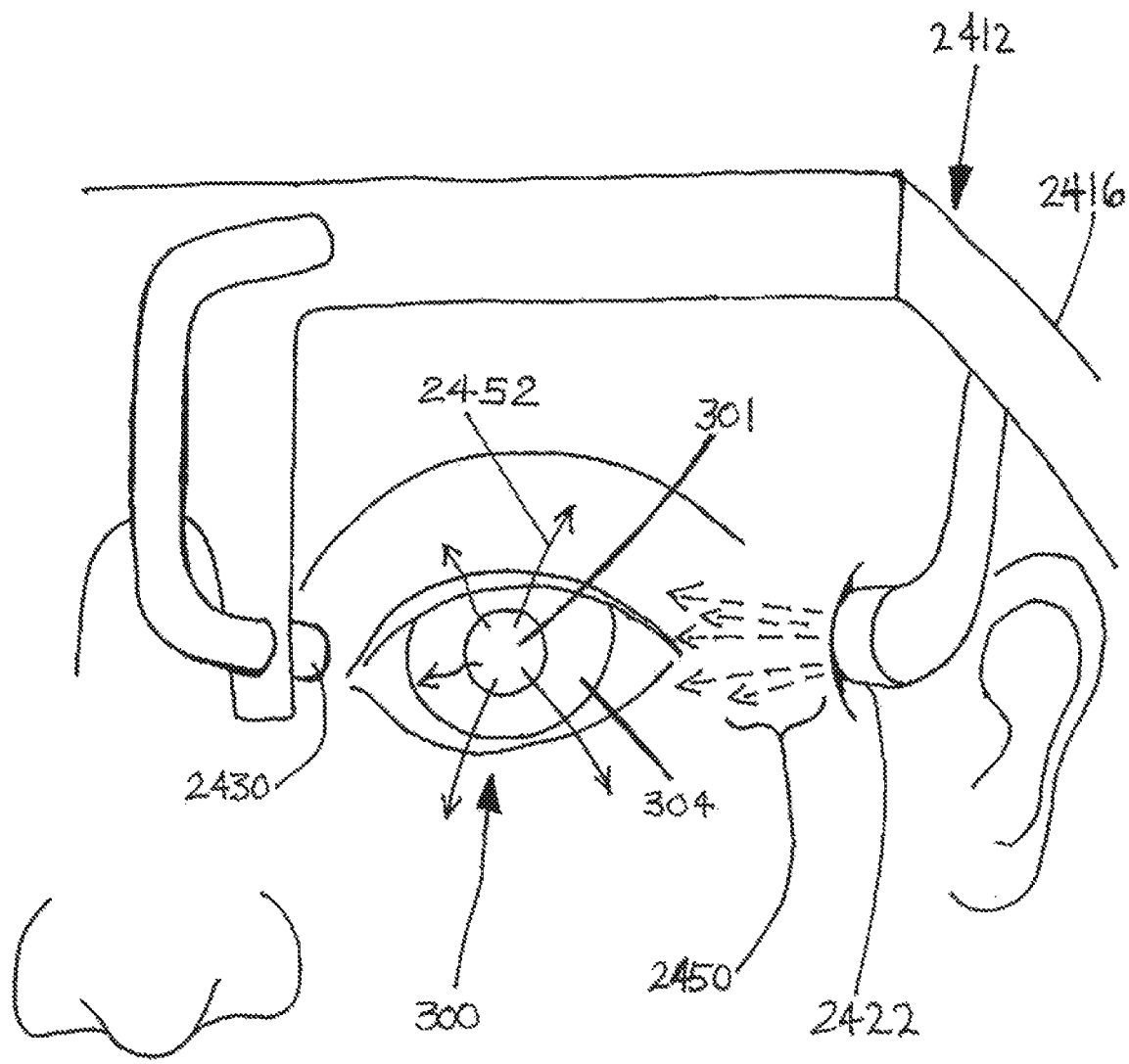
FIG. 14 is a front view of an apparatus for transcutaneously transmitting light to an eye and detecting emitted light exiting from the pupil of the eye.

Turning to FIG. 14, in another embodiment, an apparatus 2410 may be provided for transcutaneously lighting an eye 300 of a user wearing the apparatus 2410. The apparatus 2410 may be generally similar to any of the embodiments described herein, such as the frame 812 shown in FIG. 3.

Figure 17:
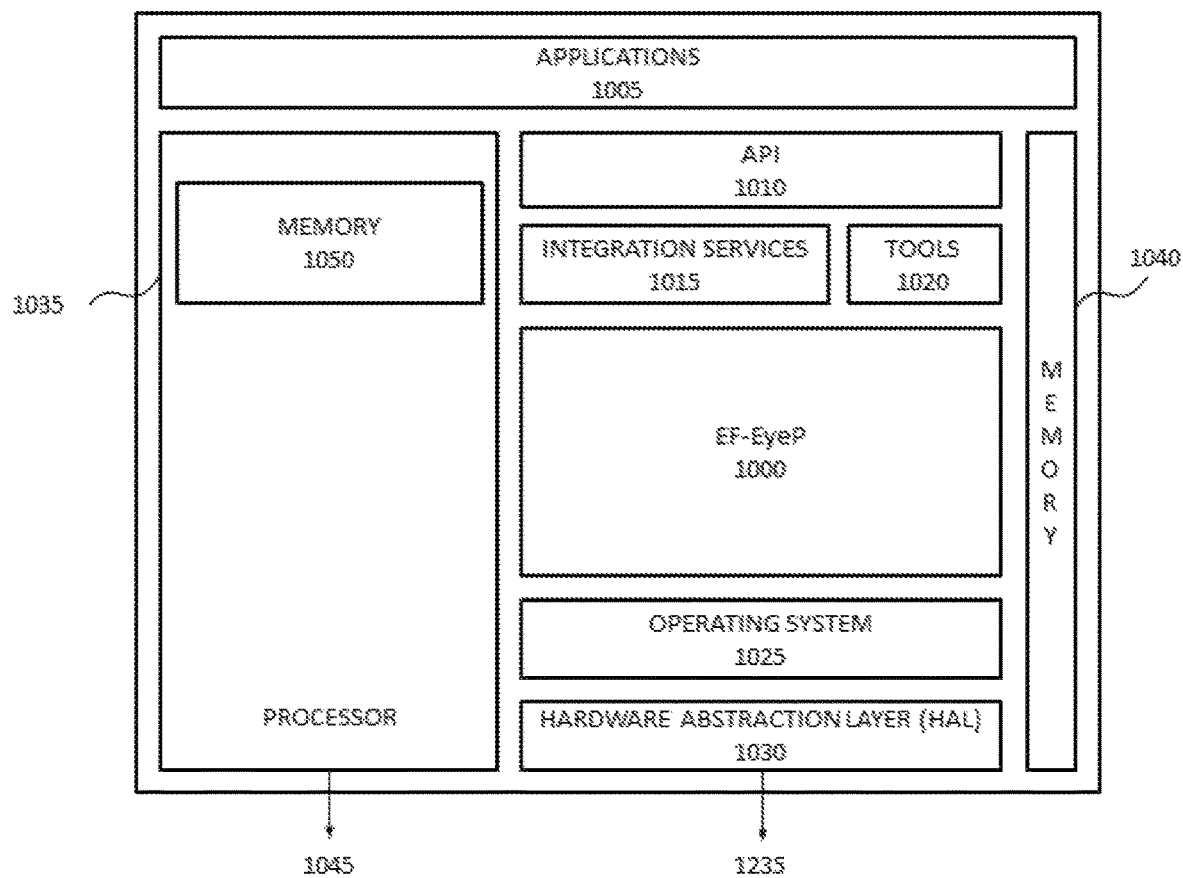
FIG. 17 shows all exemplary embodiment of system architecture that may be included in the systems and methods herein.

Turning to FIG. 17, an exemplary embodiment of an overall system architecture is shown, which may be used to perform any of the functions described herein. As shown, the system architecture generally includes a processor 1035 and memory 1040, a hardware abstraction layer (HAL) 1030 and physical connections 1235 to external hardware, an operating system 1025, control 1000 that handles the middleware services for the head mounted device, hereinafter called the EF-EyeP. Above the middleware services is a software layer 1015 containing software to facilitate the software integration of the EF-EyeP object with a third party application. Also above the middleware services is a set of software tools 1020 used for 3rd party hardware integration and debugging, including operations like single stepping and break pointing through the Joint Test Action Group (JTAG)—supported by the IEEE 1149.1 Standard Test Access Port and Boundary-Scan Architecture. Above the tools and integration layer is an API 1010, followed by applications 1005.

Figure 18:
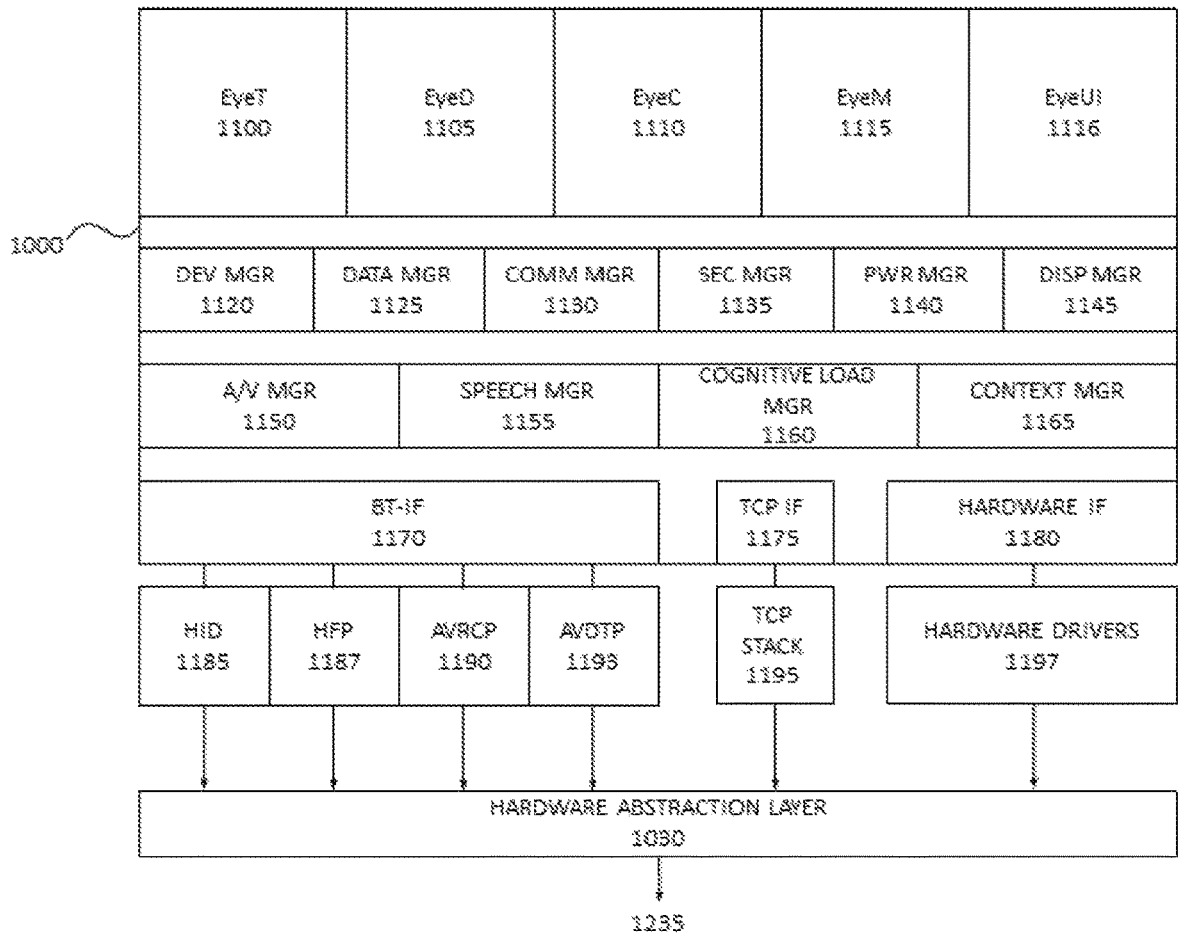
FIG. 18 shows an exemplary embodiment of an architecture for the systems and methods herein.

FIG. 18 depicts a breakdown of object 1000, the applications at the top, 1100, 1105, 1110 1115 and 1116 depict various utilities that run within the software object block 1000. Block 1110 titled EyeC represents the video image aspects referred to as EyeClips or EC, which is generally used to refer to the methods that may be performed using the systems described herein, e.g., to acquire, edit, manipulate, and/or process media images.

For all disclosures and claims within the present application, a "media image" is defined as at least one of a video image and a still image. With any type of media images a typical goal for a content creator is to produce desirable content for a specific audience. The definition of "desirable" may change based on the audience. With specific regard to video images, one method or set of criteria for selecting and editing video images may be appropriate for one audience, but not for another. Furthermore, images that are captured close in time to other images may be desirable for different reasons. These various incarnations of desirability and relevancy may be referred to simply as "saliency."

A media image may be considered salient for any number of reasons: it may contain a notable event, it may include a particular friend or relative, it may contain an occurrence that others consider interesting in social media outlets, it may have been captured at a particular location, and/or it may contain emotions that a user wishes to capture. It is assumed that the addition of eye tracking to other sensors allows a user a level of analysis and control during this process that would not be available without the advent of eye tracking.

Careful consideration is required when discussing the scope intended by the word "editing." In typical photo and video application, "editing" typically connotes manipulation of images, or, in the case of video, also includes the process of rearranging trimmed images into a more desirable order. The act of "editing" often excludes the steps of selecting or tagging images on which further steps will be performed, even though those steps should formally be considered part of the editing process. However, for purposes of this disclosure and claims within the present application, "editing" shall include the selecting and tagging steps. Furthermore, in the era before digital media creation, all editing (including selecting and tagging) necessarily occurred considerably after the time of capture. However, features are now included in video and still cameras that allow for the editing process to occur immediately after the time of capture, or "in-camera." The disclosure herein describes how the process of editing may shift to include times during or even before capture. However, it has not been practically feasible to do so until the systems and methods described herein are implemented.

Unfortunately, for many users, the time commitment required to convert as-captured video images into consumable finished video is a terminal impediment to the process. There are two common outcomes after encountering this impediment. The first is that the entire process is abandoned, and no video images are ever shared with the audience. The second common outcome is that all editing is eschewed and images of extremely low quality and low relevance are shared with the audience. Neither of these outcomes is desirable, both for the creator and for the audience. For the creator, this may reduce his or her willingness to record video, knowing that it is too difficult to edit it to a presentable form. For the consumer, watching bad video images provides them with negative reinforcement and may prevent them from wanting to watch video images in the future.

As technology advances, the form factor of the devices a user may carry to create content has shifted, as well. Content-creation devices used to be devoid of other technology. Then smartphones and tablets became capable of capturing video, thereby ushering in an era of miniaturization that was previously unimaginable. Now, head-mounted displays are starting to become feasible as consumer devices, marking a shift in wearable technology that allows it to create content instead of merely logging data from sensors or otherwise. Further, contact lenses and artificial retina are viable enhancements to the human visual system. The systems and methods herein are applicable to these modes of capturing video, tracking eye direction, and editing salient video as well, and are considered part of the present invention. As the requisite technology for determining a user's gaze through eye tracking can now be incorporated into wearable and implanted devices, the eyes become a feasible tool for device input and editing.

The first obstacle to overcome to ensure the ultimate delivery of better video clips to an audience is to select or "tag" images of interest. Typically, this is accomplished during the first editing steps. However, capabilities have been added to still cameras in recent years that allow for on-the-fly rating of images. Shifting thinking to allow for this capability in a wearable device requires a different method of tagging, but also opens up the possibility of tagging using input from one or more sensors.

One such sensor for tagging input is an eye tracking system. Video is recorded with the purpose of capturing something that can be seen with the eyes, so it is natural to deduce that information about a user's gaze during the recording process could benefit the tagging process. Metrics such as a user's gaze direction, gaze duration ("dwell"), pupil diameter, and saccadic activity are only a few examples of valuable information about a user's intent during a recording event.

Some embodiments of the systems and methods herein may employ an eye tracking subsystem designed around monocular (one-eye) eye tracking techniques, and other embodiments of the system may employ an eye tracking subsystem designed around binocular (two-eye) eye tracking techniques, as disclosed in the applications incorporated by reference herein. These embodiments are specific to the design and intended use of the wearable device. Some embodiments of the wearable device may employ a single display presented to a user, while other embodiments may employ two displays presented to a user. The embodiment of the eye tracking subsystem may not necessarily match the embodiment of the display configuration.

Some embodiments of the eye tracking subsystem herein may employ image sensors as the primary input for the subsystem, while further embodiments may employ alternative sensors that are capable of producing suitable data to determine the direction of a user's gaze.

It follows that other sensors may be used in concert with eye tracking data. For instance, a user may verbally place a tag as simple as stating the word "save," or a more is verbal cue such as a friend's name (or other identifiers of individuals in the image) for easy retrieval later. More sophisticated methods of combining input from multiple sensors may include accelerometer data, location and/or orientation data, windowing data from the camera sensor, microphone data, touch sensor data, etc., and those methods may include interpretation of data from one or more of those sensors.

For instance, a rapid change in saturation in a region of the scene-facing camera's sensor, corresponding to a location at which the user is gazing, is an obvious instance of a section of video that may have a higher-than-average probability of being saved. Additionally, a rapid and sustained change in the device's microphone may correspond to a crowd cheering loudly, and this may correspond to a higher probability of a video image being desirable.

A clear and simple use case involves a user consciously deciding that just-recorded video is particularly important. The user may be able to provide additional information to assist the system's operation with specific regard to how much of a particular occurrence should be tagged; for instance, a) the last ten (10) seconds of video, b) how long a particular person appeared in the media images, and/or c) how long the user's gaze was directed at the same person or location immediately prior to the user tagging the endpoint (or interim point) of a clip. A more complicated use case involves the system having more sophisticated heuristics with which to make its own analysis of events that the user may deem to be important. For instance, the user may pre-designate the system to tag any video in which a particular face appears, or to tag any video during which the accelerometer records >0.5 G, or even a combination of heuristics for a multiplicity of sensor data.

Figure 19:
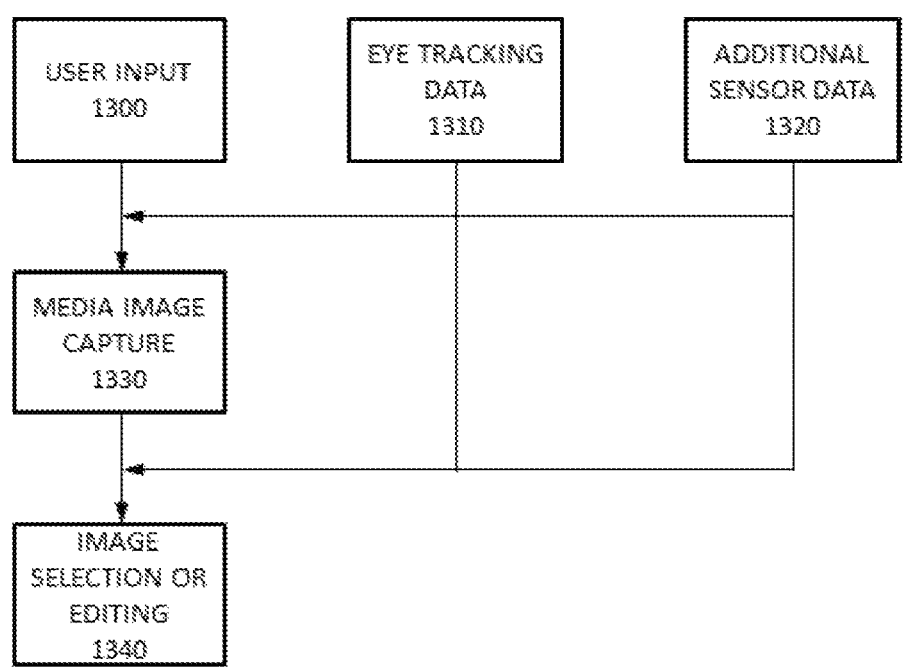
FIG. 19 is a flowchart showing exemplary factors that may be used to select and/or edit media images.
Figure 20:
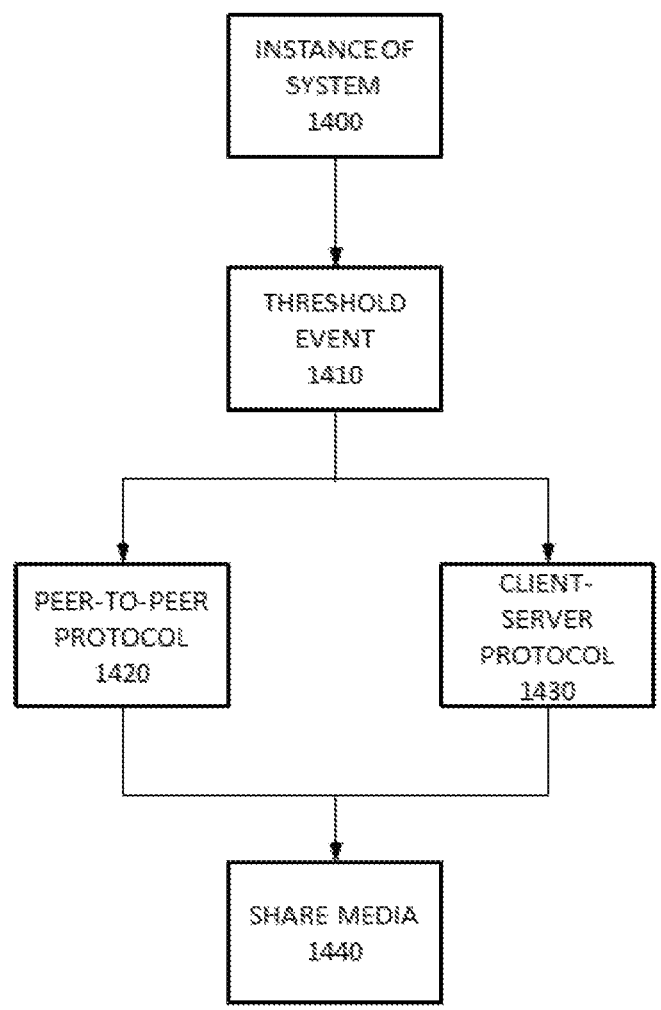
FIG. 20 is a flowchart showing an exemplary process for sharing media images.

All of these described system features are designed to aid the process of tagging, which is only the first step in the editing process. Methods for further improving the editing process are described below and/or shown in FIGS. 19 and 20.

With wide field-of-view cameras prevalent on wearable devices, there is an excellent chance that a user may desire his or her finished video footage to be cropped to a tighter window. At any given instance, the location in a scene where a user is looking ("point of regard") has a higher probability of containing the elements he or she may wish to crop to while editing. Thus, capturing point of regard information during basic video recording or during simple or complex tagging procedures adds value to the editing process.

With binocular eye-tracking, in addition to determining planar (x-y) position within a field of view, depth (z) position may be calculated for a gaze. This allows a camera to be focused to a targeted distance, or depth of field to be adjusted for more professional recordings, whether of video or still frame shots.

Further, saccadic activity during an instance of recorded video may indicate a different level of interest on a user's part. Rapid changes in gaze targets can not only indicate different targeted areas of interest, but can act as metadata to indicate attributes of a user's mindset or of elements of a scene being recorded. Additionally, one may find that the extent of a user's saccades ay indicate the bounds of an area to crop to during the editing process.

Other common video editing functionality includes creating slow- or fast-motion clips, creating smooth pans between different areas of the frame, and stabilizing shaky footage. All of these features can be enhanced by eye tracking alone, or by combining eye tracking data with data from one or more other sensors when combined with an external facing camera as discussed above.

For instance, stabilizing shaky video is often accomplished by identifying similar features between frames and normalizing adjacent frames to keep those features stationary.

Unfortunately, this also requires cropping the video, as the normalization process removes pixels from the edges of the frame. Combining eye tracking data may aid in determining the acceptable amount of stabilization, e.g., if the user is interested in the entire frame, a minimal level of stabilization may be applied to preserve as many pixels as possible. However, if a user is only interested in a particular region of the frame, maximum stabilization may be applied to result in the best possible image.

Optionally, pupil dilation and constriction may be employed as a measure of user excitement, e.g., to determine if a particular clip should be stretched into a slow-motion clip. Additionally, further sensor data may be combined with dilation data to determine the user's emotional state, an extension of which may be a different set of criteria to apply to a video clip when analyzing for regions of interest.

The system may be configured to recognize occurrences that are typically of interest, such as rainbows, sunrises, sunsets, and moonrises. These correspond to instances where input from a compass (or other directional sensor) in the device may also be part of a decision to tag a video image.

There are instances where a multiplicity of wearable devices in a crowd may be of use to law enforcement organizations. Consider an instance where a bomb detonates and panic ensues. If a plurality of the people in a crowd are wearing a device equipped with this system, all devices may simultaneously recognize the sound of the blast with their microphones, and/or simultaneously recognize a large and rapid change in ambient light and/or pixel saturation. This widespread sensor input and analysis may prompt all devices to save video images leading up to the incident ("crash camera") and/or prompt them to continue saving video it in the time after the incident. Collection of these video images from all devices may give law enforcement many angles from which to scan the crowd for evidence and suspects. Furthermore, spatial analysis of microphone and camera data at the moment of the incident may allow law enforcement to reconstruct the moments before, during, and after the incident.

Common gaze data may be combined with captured video for multiple people wearing eye-tracking equipped camera-mounted wearable devices. Processing video captured by multiple wearable cameras to determine that the cameras are observing common targets involves a large amount of image processing. The inclusion of eye-tracking data, given the propensity of viewers to observe common elements, can dramatically reduce the alignment process and reduce processing power. Further, if the intent is to extract common crowd observed targets, the use of eye-tracking data obviates the speculative probabilistic processing associated with overlaying larger field-of-view images to declare that a known percentage of the crowd are observing a common target.

There may be instances where the eye tracking subsystem is capable of producing higher gaze accuracy when a user's gaze is directed towards a particular region relative to the camera(s) directed towards the eye, or lower accuracy when the gaze moves elsewhere. For instance, if a camera tracking the eye is positioned directly in front of the eye, as the user's eye looks down, the eyelashes, or eyelids, may partially occlude key features of the eye used in eye-tracking, thus reducing the accuracy of calculated gaze. This reduced accuracy as the eye moves to certain gaze positions is referred to herein as "graceful degradation," and indicates that as the performance of the eye-tracking system degrades, but does not fully fail, the degraded information may be marked as such, and when provided to the editing system may be treated as compromised data wall reduced accuracy.

In such a case, eye tracking data may be treated with differing weights of importance or validity while computing saliency from multiple sensors. In the case that eye tracking data is the only sensor data being considered for saliency, margins may be defined such that lower accuracy (degraded) data does not cause undesirable performance from the system. As accuracy decreases, a user's experience should be predictable and consistent, and frustration should not arise from this graceful degradation of performance.

The region in which the accuracy of the eye tracking subsystem is highest may, depending upon geometry of a sensor facing the eye and the display, correspond to the region of the user's field of view occupied by the system's display. However, as the size and/or location of the display changes in different embodiments of the system, the eye tracking subsystem's precision in that region may change. Furthermore, the eye tracking subsystem may be designed to have higher precision over a larger region of a user's field of view than is occupied by the display, but it is still natural to assume that there will be regions where the precision of the eye tracking subsystem will degrade. In this case, that degradation should also be graceful and unobtrusive to a user.

The system may be configured to interpret squinting eyes as an indication of happiness or smiling, combined (or not) with the sound of laughter from an audio sensor. This may be configured as a metric by which the system assigns saliency to a video image. Furthermore, the video image may be trimmed according to a time period bounded by the start and end of the squint, or to a time period bounded by the start and end of the laughter. Brainwave activity, measured by an EEG sensor could also be used.

Many wearable electronic devices rely on aggressive power-management schemes in order to conserve battery life. One of the substantial power draws in these devices is the display, and these schemas often include aggressive management of the display's operating state. As such, the device's display may be powered down during the process of capturing media images. While some aspects of the system's design may necessarily include interaction with the device's display to ensure desired control, all system functions need not rely on the device's display being powered on in order to function properly. One such example of a scenario during which the device's display need not be powered on may be tagging a video image as salient based on input from an audio sensor. It may still be desirable for a user to have feedback that the system is operating as designed, so the device's speaker (if equipped) may be instructed by the system to output a distinctive tone or other audio recognizable by a user.

In another embodiment, the system may be configured to automatically recognize "magic moments," or media images that have saliency beyond what a user may be expecting. These magic moments may be of interest to third parties, such as a company whose product may appear at a crucial time in a video image. An example of this may be a group of friends hiking to a remote peak in a mountain range. As one or more of these friends are wearing a device equipped with this system, video images are being captured while the group summits. One member of the group tells a joke that makes everyone else laugh; coincidentally at the same moment that another member of the group pulls a brand-name soft drink from his bag and opens it. That soil drink company may have otherwise spent hundreds of thousands of dollars to create that moment through an advertising agency, so they may be interested in compensating this user for his "magic moment" instead.

In still another embodiment, the system may be configured to recognize a user's hand gestures to crop a media image. The user may have the option of creating a picture frame with his or her hands and fingers, which the system would interpret as a rectangular area to which the media image should be cropped. This virtual picture frame may be moved in any direction by the user, and the system may track both the size and/or position of the frame to continuously adjust the output video image.

In yet another embodiment, the system may be configured to receive input from sensors that are not physically located on or connected to the device. Examples of these sensors may include heart rate monitors, EEG, pulse oximeters, or fitness devices such as bicycle power meters. For instance, the system may be programmed to automatically tag any video clips corresponding to a bicyclist any time his output exceeds a predetermined level, as these moments may correspond to exciting periods of a race.

In another embodiment, the system may be configured to cater to users who wish to easily create tutorial or instructional videos. This may be accomplished by combining gaze-based cropping with tagging accomplished by recognition of pre-configured phrases such as "in the next step," or "what we see here," or "pay close attention to this." In these instances, a user's audience may be interested to know exactly what was being looked at in the scene, so a user's point of regard may be automatically overlaid onto the media image, or may be saved separately to be overlaid at a later point in the editing process.

In still another embodiment, the system may be configured to interface with social media applications, allowing for dynamic saliency that may be transparent to a user. For instance, if a particular location is trending on Twitter due to a notable and newsworthy event the system may periodically update its metrics and heuristics for saliency based on any such locations that a user may be near. Then, if a user enters any such location, media images that are captured there may be assigned higher saliency than they would be otherwise. This process may be configured by a user to be rejected or encouraged, and the operation of this feature may be evident or transparent to a user.

In another embodiment, a method for selecting and editing media images may be customized to suit a user's specific needs. Many times, however, a user may wish to simply select a pre-defined template that encompasses a plurality of metrics and heuristics based upon input from the sensor or sensors that are incorporated within the system or located remote to it.

In another embodiment, a wearer, e.g., Mary, may be broadcasting video to a remote individual, e.g., John, who is also wearing an eye-tracking equipped device with a display. As John observes the video on the display, his gaze information may be broadcast, via a network (e.g., a telecommunications network, the Internet, and the like), to Mary to direct Mary's attention and video capture. Further, John may direct Mary to turn her head by gazing at icons on his display with associated meaning, indicating his desire to move Mary's video capture in a specified direction, or to have Mary move forward or backward or up or down. For example, Mary may be recording adventure video to provide a vicarious view for John, or she may be recording news or entertainment video. The instruction provided to Mary may be aggregated by multiple remote viewers/controllers whose aggregated desired direction may be provided to Mary.

In another exemplary embodiment, the systems herein may be used for gaze-controlled, head-mounted or body mounted camera zooming, focusing, mating, an for panning. For example, many HMDs have external facing cameras. Some have high resolution cameras and lenses. In accordance with another embodiment, a system and method may be provided for coupling an integrated or attachable accessory that has an electronically controlled mechanical or electronic/optical zooming, focusing, or panning capability that may track with, be controlled by, or respond in some way to a user's gaze.

The control may result in the movement of optical components and/or electronic selection of pixels to be used within a camera chip, and/or other means to capture targeted or desired light. Such a system may include a wearable device with a scene camera mounted to capture media images of the user's surroundings; an integrated or attachable mechanism digitally controllable to focus, zoom, pan, or otherwise control the camera's lens or camera system; an eye-tracking system that captures eye tracking data of at least one eye of a user; and one or more processors communicating with the digitally (electronically) controllable mechanism, the scene camera, and eye tracking subsystem for directing the control mechanism to zoom, focus, or pan to a scene based at least in part on the eye-tracking data.

The system may interpret the eye-tracking data to perform a variety of modes of image capture (still or video), based upon the user's eye gaze activity. Control of the camera may be determined by individual or composite data captured by the system including one or more of the user's gaze points in 2d or 3d space (determined by a single eye or both eyes), gaze duration, patterns of saccadic activity in general, patterns of saccadic activity in the context of viewed entities or situations (eye-movement across text, faces, scenes, display screens with content, movies, store displays, surgeries, military exercises, security activities by security agents, sporting activities), frequency of saccades, person-specific gazes including gaze upon body parts (eyes, with mutual eye-interaction), clothing etc., other oculometrics including blink rate and duration, pupil dilation, squint, winks (intentional blinks), predictable predefined combination of the above elements, combined activities determined to match activities of salience determined using data gathered of the users' eyes.

The system may collect data across multiple users, including large numbers of users (big data) to identify and extract patterns of intentional activity (e.g., eye-gestures explicitly intended by the wearer to control zoom, focus, or panning) or unintentional activity (e.g., interpretation and/or association of such patterns with salient capture of scene imagery and desirable control of the camera zooming, panning and focusing mechanism).

An editing system coupled to the output of captured image data plus metadata regarding eye activity is contemplated. The activities performed by users with the editing system may be cataloged and/or stored. Optionally, other sensors may be included to capture data that contributes to camera control and the performance, analysis, and enhancement of the system above. These may include one or more inertial, audio, biometric and/or other sensors, as described elsewhere herein.

A lens control mechanism may be offered as an attachable accessory to a Head Mounted Device (HMD), or may be provided as an integrated hardware and software solution within an HMD. When provided as an accessory, the hardware may have additional further replaceable components such as lenses with variable optical power. The system may be calibrated with user's gaze during an installation process. This calibration may incorporate the scene camera and/or the display, so that the relative position of the accessory camera to the scene camera is determined. The calibration may involve ongoing automatic updating.

Data templates may be created to optimally extract instances of predictable video clips by using a prior knowledge of a viewer's eyes, the scene, sound, and/or other inputs to specify starting and/or ending points of the clip. Such a prior knowledge may be defined speculatively, then collected and refined among users in a range of video recording circumstances. This means that a user may, with sufficient battery power, turn on their camera for entire events; a baseball game, for instance. Key hits, runs, outs, and other plays, may be dipped and composed into compelling videos. Such videos may be manually or automatically shared privately, via social media, or even sold to buyers or maintained as life-blog library elements. Other template-able videos may include:

Birthday Party: singing Happy Birthday with candles being blown out;

Track/Cross Country Race: daughter/son running by parent (with HMD) or crossing the finish line;

Football Game: a quarterback throwing a football to a receiver who catches the ball and runs to a touchdown;

Baseball Game: a pitcher patching to a batter who hits a homerun—and other events, so that a user may record the entire game and the salient events from the user's physical point-of-view may be extracted. Further, the clips may be enhanced by automatic zoom, focus, depth of field, and panning with appropriate controlled camera equipment, as described elsewhere herein;

Dinner Party Scanning People at a Dinner Table: the wearer looks around at the guests. Video eye-clipped from end of user scan back to beginning, or vice versa. May be further sub-selected, e.g., during a toast;

Family/Group Video on Vacation in front of Vistas: Video or images extracted for most interesting group assembly;

Holidays;

Specific Work Functions;

Award Events;

Celebrations.

When contextualized with additional data, these video templates may automatically be enhanced with supplementary text regarding the time, place, people, event, sub-event, performance information, and more.

In another embodiment, multiple users' scenes may include clips recorded for multiple users at a common location, informed by templates as described above, and then built into a composite set of scene shots to form a compelling video production—in real time or non-real time. These will likely have many users wearing HMDs, with high-quality electronically controlled cameras driven by templates, gaze data, and other sensory input. The video feeds and clips may gaze-synchronized, geo-synchronized and/or time-synchronized to produce high quality real-time or non-real time "crowd-sourced" video. Further, licensed Gaze-Augmented Video from celebrities, professionals, or expert's gaze data combined with video capture may be captured and sold for real-time or non real time use. Another scene is a ball game with a scene camera with gaze data broadcast from a player's perspective. The video may be overlaid with indicator (reticle) of the player's gaze direction, or the video could be enhanced with zoom, etc. driven by the player's gaze (as outlined above) and/or other sensors. The reticle-overlaid video or gaze-enhanced (zoomed+) video may be provided/sold in real-time to viewers of the game, to the player a coach for training review, to aspiring school-age sports players, or to video game producers. The value of such enhanced video may extend to a vast range of activities from sports and entertainment, to military training, surgery, and more.

Another embodiment for EyeClips is video clipping for advertisers. Advertisers spend large sums to create real-life, compelling, emotional scenarios that may contain product shots, or be related to product shots. HMD wearers may be motivated to let their cameras run (when sufficiently powered) for specific activities (white-water rafting, mountain biking, skiing, sky diving) with the intent of recording quality video valuable to advertisers; clips containing, for instance, Coca Cola cans. A system may be provided to transmit select clips to advertisers, and for advertisers to pay for valuable clips.

Another embodiment includes when is termed Collective Consciousness, a system and method to predict individual stocks, stock market direction, international events, political outcomes, movie outcomes, theater outcomes, real-time sport-event predictions, health-threats and other occurrences predictable in some manner based upon human observation, sensory input, and associated measurable human reaction.

A wearable computer with sensory capture data as described herein enables predictive data creation that has not existed heretofore. Wearers of computers may be asked to capture specific data and possibly seek out specific locations where images, sound, human reactions, and/or other sensory input are desired. Or, wearers may be asked for their permission to allow data to be captured personally, or aggregated and made anonymous, without their involvement. With the proliferation of video capture with related eye-tracking data, oculometrics, biometrics, and other sensors, a system may be provided to draw upon collective consciousness or collective sub-consciousness to predict future events and outcomes. For instance, laborers on a Florida orange field might be equipped with eye-tracking-enabled wearable computers with cameras and displays. Data may be collected regarding their harvesting behavior and observations to predict forthcoming orange juice futures. At times, individual workers may be directed, via display information, to take certain actions that capture more useful data, such as examining an orange more closely, or responding to a question asking their opinion regarding the crop or other information. White-collar workers wearing eye-tracking enabled wearable computers with cameras and displays may be monitored for their television viewing, radio listening, or web browsing habits and/or their reaction to television broadcasts (a portable, sensory-capture-equipped, Neilson monitoring device), radio shows, and/or web content. The collective consciousness derivable from such data may also be interpreted and may drive questions, instructions, and/or actions that may be delivered back to wearers in real-time or non-real time.

Another embodiment includes using binocular eye-tracking on a monocular display to provide 3D augmentation for UI, UX and/or Other Augmented Reality Binocular/monocular tracking. Tracking with two cameras to capture three dimensional (3D) gaze data (with a z-axis, in addition to the planar x-y axis data provided from a single eye) provides three dimensional point of regard. A system may be equipped with no display, one display for a single eye, one display both eyes, or one display for each eye to use binocular tracking data in a variety of manners.

Options for displays, when two displays are provided, may include one for each eye, whether for a partial field of view, full field of view with transparency through the displays and augmented reality overlay of information, or full field of view occluded with all images of the external world, and any augmented reality overlay presented on otherwise opaque displays.

Using two cameras directed towards the eyes to obtain binocular gaze information, the processor calculating gaze information may send information to the processors controlling the display data to present a three dimensional overlaid image of UI information or "augmented reality" (or "AR") information/imagery to produce some amount of simulated stereo imagery on a single mono display viewable by one eye, a single mono display viewable by both eyes, or two mono displays viewable separately by both eyes. In this way, binocular tracking may enable an effective three dimensional display or three dimensional dialogues on a single display screen. As a user converges their eyes or diverges them, the display may change to create a sense of dimensionality. When the user's eyes both focus on items at distance Z, they move in tandem via yoke muscles, even when the user is using only one eye to view a presented scene, perhaps with the dominant eye. The system for presenting information to emulate dimensionality may be sensitive to eye dominance.

The UI presents an image for an element that is out of focus on the display, motivating the user to focus by diverging or converging their eyes. If, for instance, the image is ostensibly closer, and the user chooses to focus on the image, with proper feedback as the user converges his eyes (to look closer, as can be measured by the binocular eye-tracking cameras) or diverges (to look further away) images may be shifted relative to one another, and made to focus or defocus. When the user wants to look at something closer, which might be presented artificially in a fuzzy image, if the user's eyes converge/diverge, images may modified as seen by one or both eyes.

In addition, or alternatively, pupil dilation also may be tracked to determine when to change the perceived dimensionality within a scene view. For instance, when looking at a distant object with a single dominant eye, an object to be shown in the foreground may be shown out of focus. As the user shifts this dominant eye, even a small amount (0.5 degrees, for instance) to gaze at the defocused foreground image, the image may be brought into focus, causing the user's pupil to react, as well as creating a sense that the new target is nearer. Simultaneously, the distant image may be modified to create a greater perception of distance.

Intentional/subconscious tagging or editing allows for real-time in intentional user tagging of the start and/or end of a potential valuable clip by interacting with the display in a variety of manners. This tagging occur via interaction with a display or with no display. When interacting with a display, there may be a dialogue between the user and the display, incorporating a visual menu towards which the user gazes, controlling the display with fixations, dwells, saccades, on-screen, off-screen, on/off screen actions. The display may be opaque, translucent, or transparent. It may be a partial field-of-view display or a full field-of-view display. The dialogue may assist the user in expediting the tagging activity, deciding whether to tag or not, deciding what to tag, obtaining information regarding how long the clip should be, focusing on salient areas within a field of view, enhancing the clip with text, voice annotation, special effects, incorporating other sensory information that may be visible or available as metadata. Additional options for tagging media images may include one or more of the following:

The tagging may be in non-real time before or after a clip is recorded;
The tagging may be performed with other inputs or control without the use of a display;
The tagging may occur when the system incorporates the user of contact lenses that may incorporate eye-tracking and/or display capability.

The dialogue between the user and the processor to control tagging and editing may incorporate collection of data from EEG or other biometric sources, and may provide feedback via brainwave stimulation or sensory feedback to a user. Processing to calculate editing clips, overlays, effects, and enhancements may be performed locally, shared among distributed user processors, or may be performed op a remote server.

The invention supports operation where the display is observable within a partial field of view of the user, multiple partial fields of view, or up to the full field of view of a user. The display may range from being completely transparent to any brightness level of any image overlaid on the real world image seeing through the display to augment the user's view of the world and display. Further, a configuration that incorporates a non-transparent display, whose image is fully electronically generated (typically referred to as a virtual reality display) may be used with supplementary imagery or visual controls and feedback overlaid as noted above and clearly demonstrate and support the heuristic selection of a starting point of a video clip whose ending point is tagged by an explicit action of a user.

For the sake of convenience, the operations shown and described herein are described as various interconnected functional blocks or distinct software modules. This is of necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software. These functional blocks clearly support the use of wearable display technologies include projecting images onto the retina, wearable contact lenses with integrated, projected, or other displays, and wearable contact lenses with integrated eye tracking capabilities.

It will be appreciated that elements or components shown with any embodiment herein are exemplary for the specific embodiment and may be used on or in combination with other embodiments disclosed herein. While the invention is susceptible to various modifications, and alternative forms, specific examples thereof have been shown in the drawings and are herein described in detail. However, it should be understood that the invention is not to be limited to the particular forms or methods disclosed, but to the contrary, the invention is to cover all modifications, equivalents and alternatives falling within the scope of the appended claims.

We claim:

1. A system for monitoring eye movement, comprising:
a wearable device;
an array of emitters mounted on the device to project a reference frame onto at least one eye of a user;
a camera mounted on the device and oriented toward at least one eye of the user;
an exo-camera configured to capture images of the user's surroundings;
a display; and
a processor to:
monitor parameters of the user's eye relative to the reference frame by identifying edges of a pupil of the at least one eye based on images captured by the camera and approximating coordinates of the pupil relative to the reference frame based on the identified edges;
receive and process images of the user's surroundings from the exo-camera; and
correlate the coordinates of the pupil relative to the reference frame with the images of the user's surroundings and superimpose a graphic on exo-camera images of the user's surroundings displayed at the display to identify an approximate location at which the user is looking relative to the user's surroundings.

2. The system of claim 1, wherein the camera comprises a fiber optic bundle including a first end mounted to the device and a second end coupled to a detector to convert images captured by the camera into digital video signals.

3. The system of claim 2, wherein the camera further comprises an objective lens at the first end of the fiber optic bundle, the objective lens to focus images onto the fiber optic bundle.

4. The system of claim 3, wherein the array of emitters comprises one or more illumination fibers of the fiber optic bundle, the one or more illumination fibers terminating adjacent to the objective lens.

5. The system of claim 1, wherein the processor is further to detect a state of drowsiness or lack of consciousness of the user.

6. The system of claim 5, further comprising a feedback device to provide feedback to the user in response to the processor detecting a predetermined condition.

7. The system of claim 6, wherein the feedback device comprises one of: a mechanical vibrator device to provide tactile vibrating stimuli to the user, an electrode to produce electrical stimuli, an audio emitter, an olfactory emitter, a heat-generating device, and a cold-generating device.

8. The system of claim 1, wherein the display is configured to display images of at least one of the user's eyes.

9. The system of claim 8, wherein the processor is to approximate a border between an edge of the pupil of the user's eye and the iris of the user's eye based on a contrast between the edge of the pupil and the iris.

10. The system of claim 9, wherein the processor is further to superimpose a halo on the displayed images of the user's eyes based on the approximated border.

11. The system of claim 10, wherein the processor is further to determine a level of drowsiness or other condition of the user based on a diameter of the halo.

12. The system of claim 1, wherein the reference frame comprises at least one of: a vertical band of reference points, a horizontal band of reference points, or crossed bands of reference points.

13. A method, comprising:
projecting, at an emitter, a reference frame onto a user's eye;
capturing eye tracking data comprising images of a pupil and eyelid of the user's eye at an eye-tracking camera of a wearable device;
monitoring parameters of the user's eye relative to the reference frame, wherein monitoring comprises identifying edges of the pupil based on images captured by the eye-tracking camera and approximating coordinates of the pupil relative to the reference frame based on the identified edges; and
correlating the coordinates of the pupil relative to the reference frame with images of the user's surroundings captured at an exo-camera; and
superimposing a graphic on exo-camera images of the user's surroundings displayed at a display to identify an approximate location at which the user is looking relative to the user's surroundings.

14. The method of claim 13, further comprising displaying images of the user's eye at the display.

15. The method of claim 14, further comprising approximating a border between an edge of the pupil of the user's eye and the iris of the user's eye based on a contrast between the edge of the pupil and the iris.

16. The method of claim 15, further comprising superimposing a halo on the displayed images of the user's eyes based on the approximated border.

17. The method of claim 16, further comprising detecting a state of drowsiness or lack of consciousness of the user based on a diameter of the halo.

18. The method of claim 13, further comprising providing feedback to the user in response to the processor detecting a predetermined condition.

19. The method of claim 18, wherein providing feedback comprises one of: providing tactile vibrating stimuli to the user, providing electrical stimuli, emitting audio sounds, emitting olfactory stimuli, emitting heat, and emitting cold.

20. The method of claim 13, wherein the reference frame comprises at least one of: a vertical band of reference points, a horizontal band of reference points, or crossed bands of reference points.

* * * * *